United States Patent
Matsuki et al.

(10) Patent No.: US 10,871,650 B2
(45) Date of Patent: Dec. 22, 2020

(54) DISPLAY APPARATUS AND LIGHT GUIDE DEVICE

(71) Applicant: SEIKO EPSON CORPORATION, Tokyo (JP)

(72) Inventors: Hayato Matsuki, Suwa (JP); Takashi Takeda, Suwa (JP); Shohei Yoshida, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 7 days.

(21) Appl. No.: 15/923,528

(22) Filed: Mar. 16, 2018

(65) Prior Publication Data

US 2018/0284446 A1   Oct. 4, 2018

(30) Foreign Application Priority Data

Mar. 28, 2017   (JP) .................. 2017-062398

(51) Int. Cl.
*G02B 27/01*   (2006.01)
*G02B 6/00*    (2006.01)
*F21V 8/00*    (2006.01)

(52) U.S. Cl.
CPC ......... *G02B 27/0172* (2013.01); *G02B 6/003* (2013.01); *G02B 6/0055* (2013.01); *G02B 6/002* (2013.01); *G02B 2027/0178* (2013.01)

(58) Field of Classification Search
CPC ...... G02B 27/01; G02B 6/00; G02B 2027/01; F21V 8/00
See application file for complete search history.

(56) References Cited

U.S. PATENT DOCUMENTS

| 6,829,095 | B2 * | 12/2004 | Amitai | ................. | G02B 6/0018 359/629 |
| 9,248,616 | B2 | 2/2016 | Amitai | | |
| 2003/0165017 | A1 * | 9/2003 | Amitai | ................. | G02B 6/0018 359/636 |
| 2011/0310491 | A1 * | 12/2011 | Takagi | ............... | G02B 27/0172 359/633 |
| 2014/0327603 | A1 * | 11/2014 | Hiraide | .............. | G02B 27/0172 345/8 |

(Continued)

FOREIGN PATENT DOCUMENTS

JP   2013054350 A   *   3/2013
JP   5698297 B2        4/2015

(Continued)

*Primary Examiner* — Michelle M Iancoletti
*Assistant Examiner* — Danell L Owens
(74) *Attorney, Agent, or Firm* — Oliff PLC

(57) ABSTRACT

A light guide system includes a transparent light guide portion that guides light beams incident from one end side to a light-emitting portion. The light guide portion includes a plurality of partial reflection surfaces that are disposed between a first surface and a second surface which are parallel to each other and are inclined at the same angle such that a first end portion is positioned closer to the one end side than a second end portion is. Intervals between the partial reflection surfaces in a first direction are widened from the one end side toward another end side. In a state where the light guide portion is disposed in front of an eye of an observer, the light guide portion is inclined such that the another end side is further away from a face of the observer than the one end side is.

11 Claims, 15 Drawing Sheets

(56) References Cited

U.S. PATENT DOCUMENTS

| | | | |
|---|---|---|---|
| 2015/0323788 A1* | 11/2015 | Zou | G02B 27/30 |
| | | | 359/630 |
| 2016/0282622 A1 | 9/2016 | Hiraide | |
| 2017/0045744 A1* | 2/2017 | Amitai | G02B 27/0172 |
| 2017/0219830 A1* | 8/2017 | Komatsu | G02B 17/086 |
| 2017/0371155 A1* | 12/2017 | Kamiya | G02B 27/0101 |

FOREIGN PATENT DOCUMENTS

| | | |
|---|---|---|
| JP | 2016-042136 A | 3/2016 |
| JP | 2016-177231 A | 10/2016 |
| JP | 2017-003845 A | 1/2017 |
| JP | 2017049511 A * | 3/2017 |
| WO | 01/95027 A2 | 12/2001 |
| WO | 2016/027442 A1 | 2/2016 |

* cited by examiner

FIG. 3

| SURFACE NUMBER | | | (3) | (4) | (5) | (6) | (7) | (8) |
|---|---|---|---|---|---|---|---|---|
| CURVATURE RADIUS | 1/C | | 47.32704 | 20.43138 | -94.4124 | -18.27486461 | -32.55955172 | -20.5164 |
| NORMALIZED RADIUS | R0 | | 10 | 10 | 10 | 1 | 1 | 10 |
| CONIC COEFFICIENT | k | | 0 | 0 | 0 | 0 | 0 | 0 |
| ASPHERICAL COEFFICIENT An, m | n | m | | | | | | |
| | 1 | 0 | 0 | 0 | 0 | 0 | 0 | 0 |
| | 0 | 1 | 0 | 0 | 0 | 0 | 0 | 0 |
| | 2 | 0 | 0.30111 | -0.65248 | 7.481127 | 0 | 0 | 22.199 |
| | 1 | 1 | 0 | 0 | 0 | 0 | 0 | 0 |
| | 0 | 2 | -1.49649 | -2.19068 | -0.97359 | 0 | 0 | -2.20855 |
| | 3 | 0 | 0 | 0 | 0 | 0 | 0 | 0 |
| | 2 | 1 | -0.38934 | -0.48843 | 4.307729 | 0 | 0 | 0.825022 |
| | 1 | 2 | 0 | 0 | 0 | 0 | 0 | 0 |
| | 0 | 3 | -0.17699 | -0.20942 | -1.57325 | 0 | 0 | -0.8926 |
| | 4 | 0 | 1.190703 | 0.462939 | 0.057625 | 0.000448014 | 0.000395598 | 115.6255 |
| | 3 | 1 | 0 | 0 | 0 | 0 | 0 | 0 |
| | 2 | 2 | 0.36527 | -0.18742 | 0.522778 | 0.000896029 | 0.000791197 | -30.5015 |
| | 1 | 3 | 0 | 0 | 0 | 0 | 0 | 0 |
| | 0 | 4 | -0.10208 | -0.05259 | 0.783201 | 0.000448014 | 0.000395598 | 0.171161 |
| | 5 | 0 | 0 | 0 | 0 | 0 | 0 | 0 |
| | 4 | 1 | -0.75152 | 0.310014 | 5.331907 | 0 | 0 | 69.49481 |
| | 3 | 2 | 0 | 0 | 0 | 0 | 0 | 0 |
| | 2 | 3 | 0.067009 | -0.5254 | 0.2932 | 0 | 0 | -2.61446 |
| | 1 | 4 | 0 | 0 | 0 | 0 | 0 | 0 |
| | 0 | 5 | -0.08797 | -0.26988 | 0.207203 | 0 | 0 | -0.27466 |
| | 6 | 0 | 2.007158 | 0.033345 | -1.17421 | -2.97E-06 | -8.19E-07 | 1182.16 |
| | 5 | 1 | 0 | 0 | 0 | 0 | 0 | 0 |
| | 4 | 2 | 0.637684 | -0.03644 | 12.61574 | -8.90E-06 | -2.46E-06 | -409.229 |
| | 3 | 3 | 0 | 0 | 0 | 0 | 0 | 0 |
| | 2 | 4 | 0.034959 | 0.704564 | -11.3076 | -8.90E-06 | -2.46E-06 | 6.221191 |
| | 1 | 5 | 0 | 0 | 0 | 0 | 0 | 0 |
| | 0 | 6 | 0.070356 | -0.1718 | -5.68874 | -2.97E-06 | -8.19E-07 | -0.66636 |

$$Z = \frac{c \cdot (x^2 + y^2)}{1 + \sqrt{1 - (1+K)c^2 \cdot (x^2 + y^2)}} + \sum\sum_{j=[(m+n)^2+m+3n]/2+1} (Cj(m,n) \times x^m \times y^n) \quad \text{(EQUATION 1)}$$

| SURFACE NUMBER | SURFACE INTERVAL | REFRACTIVE INDEX (nd) | ABBE NUMBER ($\nu$) |
|---|---|---|---|
| (3) | 7.7 | 1.531 | 56 |
| (4) | 4.9 | 1.531 | 56 |
| (3) | 2.5 | | |
| (5) | 6 | 1.531 | 56 |
| (6) | 1.2 | | |
| (7) | 2.3 | 1.585 | 30 |
| (8) | 2.1 | | |

DISPLAY APPARATUS AND LIGHT GUIDE DEVICE

BACKGROUND

1. Technical Field

The present disclosure relates to a display apparatus and a light guide device.

2. Related Art

As a light guide portion of a light guide device used in a display apparatus or the like, a configuration in which a plurality of obliquely-inclined half mirrors are provided in parallel and at equal intervals between two planes (a first surface and a second surface) extending from one end side on which image light beams are incident toward another end side, has been proposed (refer to JP-A-2016-177231). In the light guide device, the image light beams are reflected between the first surface and the second surface, travel through the light guide portion from one end side toward another end side, and are emitted from the half mirrors toward an eye of an observer. Thus, the observer can recognize a virtual image, and light beams from the outside can reach the eye of the observer via the light guide portion.

In addition, a configuration in which a plurality of obliquely-inclined half mirrors are provided between two flat surfaces (a first surface and a second surface) in parallel with a light-emitting portion of the light guide device, has been proposed (refer to JP-A-2017-3845). In a paragraph [0046] of JP-A-2017-3845, a configuration in which the half mirrors are disposed at a variable pitch in a light-emitting portion, or a configuration in which a predetermined pitch pattern including pitches increased and decreased in a plurality of stages is repeated, has been proposed.

As illustrated in FIG. 16, in the light guide device described in JP-A-2016-177231, in a state where the display apparatus is mounted on a head of an observer, when viewed from an eye E of the observer, there is a gap 559 between two partial reflection surfaces 55 (half mirrors) adjacent to each other in a first direction X that are positioned on the one end 51 side of the light guide portion 50 on which the image light beams L are incident, and as a result, a portion in which the image light beams L are omitted may be recognized in a streak shape. On another hand, when viewed from the eye E of the observer, there is an overlap portion 558 between two partial reflection surfaces 55 adjacent to each other in the first direction X among the partial reflection surfaces 55 that are positioned on another end 52 side of the light guide portion 50, and as a result, a high-brightness streak may be recognized. Although a configuration in which the half mirrors are disposed at a variable pitch or the like has been proposed in JP-A-2017-3845, the configuration cannot prevent a streak from being recognized on the image.

SUMMARY

An advantage of some aspects of the embodiment is to provide a display apparatus and a light guide device capable of suppressing degradation in image quality due to the overlap portion and the gap between the adjacent partial reflection surfaces among the plurality of partial reflection surfaces disposed parallel to each other in the light guide portion.

According to an aspect of the embodiment, there is provided a display apparatus including: an image generation system; and a light guide device that includes a transparent light guide portion which guides image light beams emitted from the image generation system to a light-emitting portion, in which wherein the light guide portion includes a first surface extending from one end side on which the image light beams are incident toward another end side in a first direction, a second surface extending in the first direction so as to be parallel to the first surface on one side of a second direction intersecting with the first direction, and a plurality of partial reflection surfaces which are disposed along the first direction between the first surface and the second surface and are inclined at the same angle from a normal direction with respect to the second surface toward the one end side, in which intervals between the plurality of partial reflection surfaces in the first direction are widened from the one end side toward the another end side, and in which, in a state where the light guide portion is disposed in front of an eye of an observer, the light guide portion is inclined such that the another end side is further away from a face of the observer than the one end side is.

In this configuration, in the plurality of partial reflection surfaces disposed parallel to the light guide portion, the intervals in the first direction are widened from the one end side toward the another end side. Therefore, in a state where the display apparatus is mounted on a head of an observer, when viewed from an eye of the observer, in the two adjacent partial reflection surfaces positioned on the one end side of the light guide portion on which the image light beams are incident, the gap between the partial reflection surfaces is narrow, and in the two adjacent partial reflection surfaces positioned on the another end side of the light guide portion, the overlap portion between the partial reflection surfaces has a narrow width. In addition, the light guide portion is inclined such that the another end side is further away from the face of the observer than the one end side is. Thus, there is an extremely-narrow gap or there is no gap between the two adjacent partial reflection surfaces positioned on the one end side of the light guide portion. In addition, in the two adjacent partial reflection surfaces positioned on the another end side, there is an extremely-narrow overlap portion between the partial reflection surfaces or there is no gap. Therefore, it is possible to suppress occurrence of a portion in which the image light beams emitted from the one end side are omitted in a streak shape, and it is possible to suppress occurrence of a high-brightness streak in the image light beams emitted from the another end side. Accordingly, it is possible to suppress degradation in image quality due to the overlap portion and the gap between the adjacent partial reflection surfaces, and thus the observer can recognize a high-quality image.

BRIEF DESCRIPTION OF THE DRAWINGS

The disclosure will be described with reference to the accompanying drawings, wherein like numbers reference like elements.

FIG. 3 is an explanatory diagram illustrating design examples of a projection lens system and a light-incident portion illustrated in FIG. 2.

DESCRIPTION OF EXEMPLARY EMBODIMENTS

Figure 1:
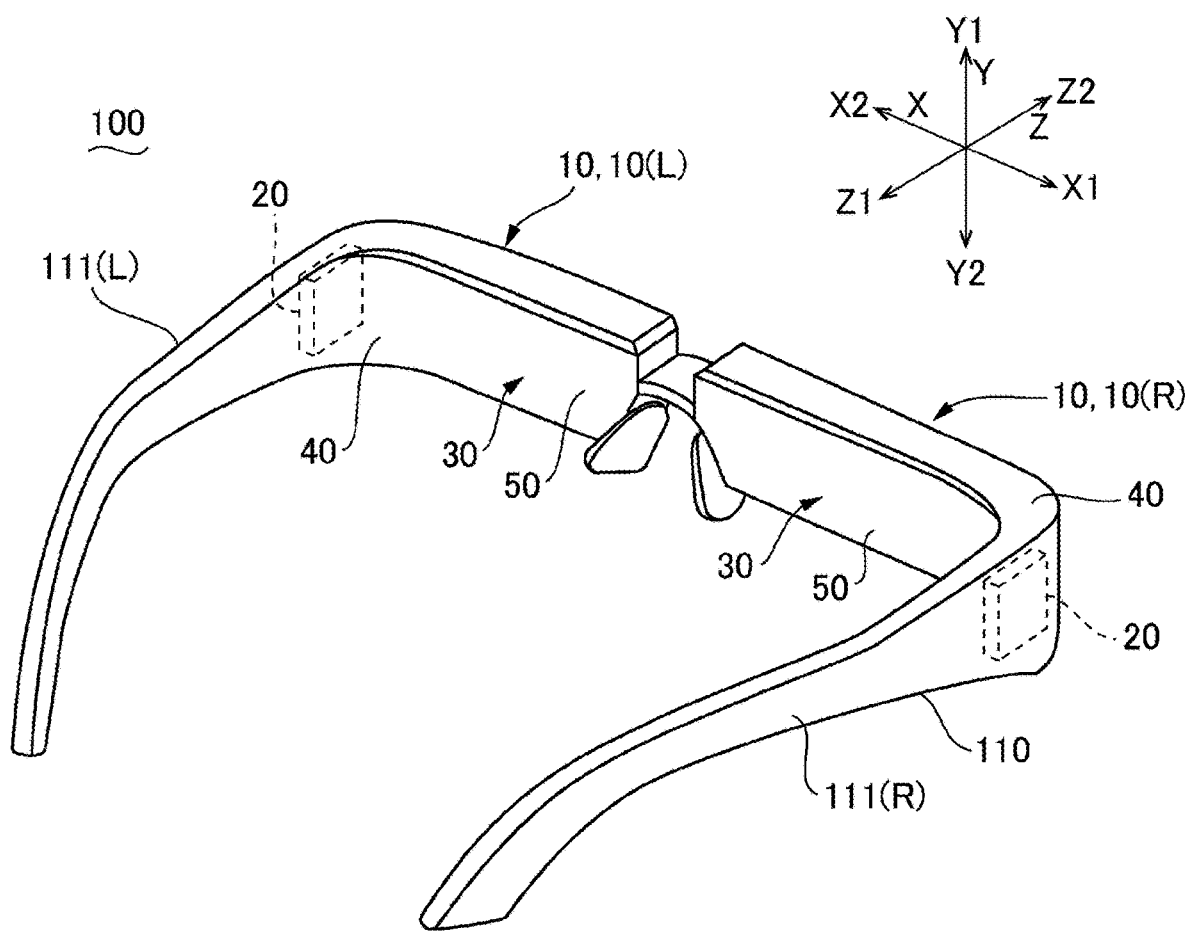
FIG. 1 is an explanatory view schematically illustrating an example of an appearance of a display apparatus according to a first embodiment.

Hereinafter, embodiments according to the disclosure will be described. In the drawings to be referred to in the following description, in order to make each layer and each member to be recognizable on the drawings, the number and the scale of each layer and each member are made different.

First Embodiment

Overall Configuration

FIG. 1 is an explanatory view illustrating an example of an appearance of a display apparatus 100 according to a first embodiment. The display apparatus 100 illustrated in FIG. 1 is configured with a see-through type eye glass display or the like, and includes a frame 110 provided with temples 111(R) and 111(L) on left and right sides thereof. In the display apparatus 100, a display unit 10 to be described is supported by the frame 110, and an image emitted from the display unit 10 is recognized by a user, as a virtual image. In the present embodiment, the display apparatus 100 includes a right-eye display unit 10(R) and a left-eye display unit 10(L) as the display unit 10. The right-eye display unit 10(R) and the left-eye display unit 10(L) have the same configuration, and are disposed symmetrically in a right-left direction. Thus, in the following description, the right-eye display unit 10(R) will be mainly described, and a description of the left-eye display unit 10(L) will be omitted. In the following description, a right-left direction is referred to as a first direction X, a front-rear direction is referred to as a second direction Z, and a upper-and-lower direction is referred to as a third direction Y. In addition, one side (right side) in the first direction X is referred to as X1, the other side (left side) in the first direction X is referred to as X2, one side (rear side) in the second direction Z is referred to as Z1, the other side (front side) in the second direction Z is referred to as Z2, one side (upper side) in the third direction Y is referred to as Y1, and the other side (lower side) in the third direction Y is referred to as Y2. Here, since the right-eye display unit 10(R) and the left-eye display unit 10(L) are disposed symmetrically, in the right-eye display unit 10(R) and the left-eye display unit 10(L), one side X1 and the other side X2 in the first direction X are reversed to each other in a right-left direction.

Overall Configuration of Display Unit 10

Figure 2:
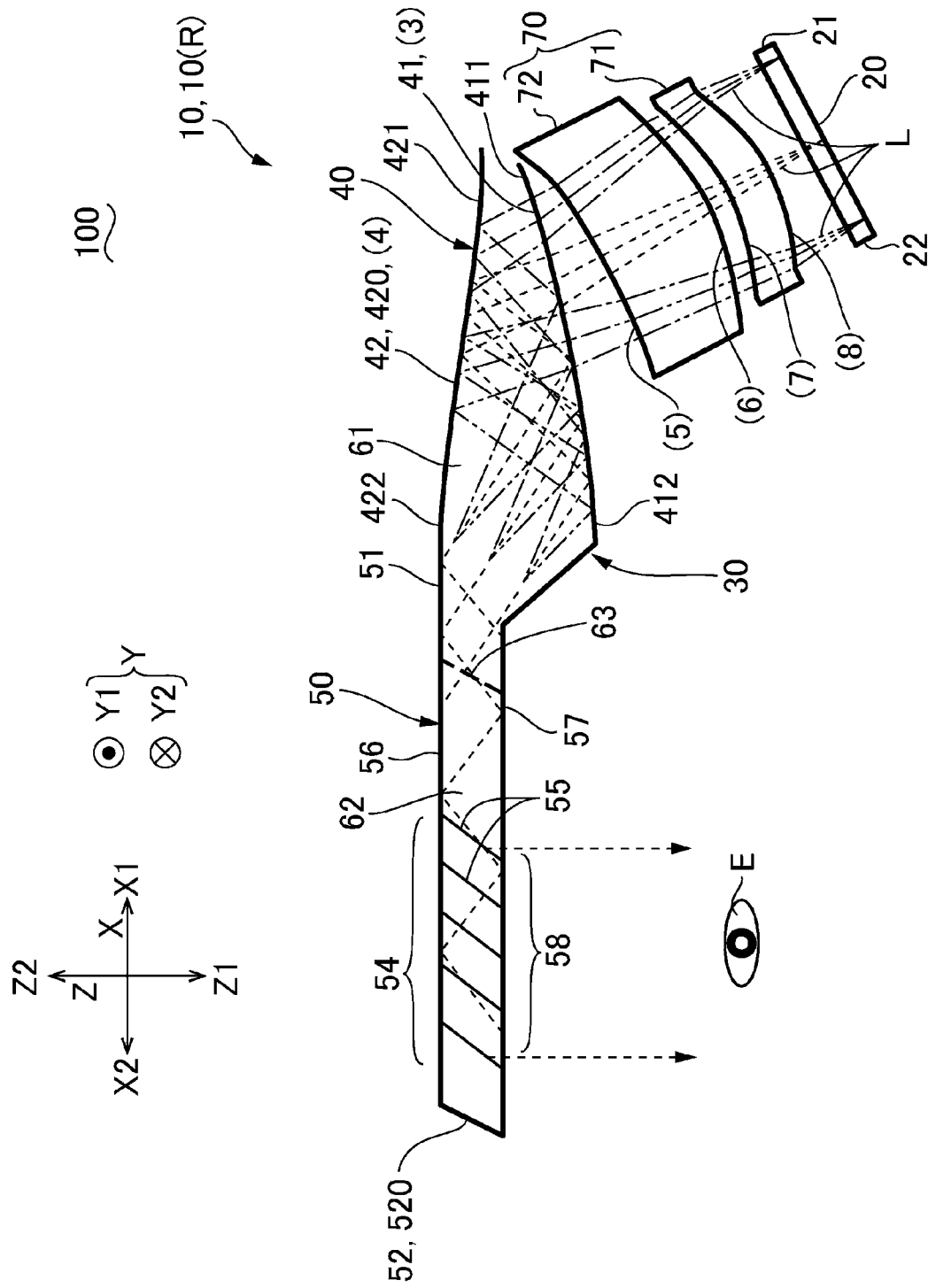
FIG. 2 is a plan view of an optical system of the display apparatus illustrated in FIG. 1.

FIG. 2 is a plan view of an optical system of the display unit 10 illustrated in FIG. 1. In FIG. 2, image light beams L emitted from the center of an image generation system 20 are illustrated by dotted lines, and image light beams L emitted from end portions of the image generation system 20 are illustrated by one-dot chain lines and two-dot chain lines. As illustrated in FIG. 2, the display unit 10 (display unit 10(R)) includes an image generation system 20 that emits image light beams L as non-parallel light beams and a light guide system 30 that guides the incident image light beams L to a light-emitting portion 58, and the light guide system 30 is a light guide device to which the embodiment is applied. In the present embodiment, a projection lens system 70 is disposed between the image generation system 20 and the light guide system 30, and the image light beams L emitted from the image generation system 20 are incident on the light guide system 30 via the projection lens system 70. The projection lens system 70 includes two lenses including a first lens 71 and a second lens 72 disposed between the first lens 71 and the light guide system 30.

The light guide system 30 includes a transparent light-incident portion 40 that includes a light-incident curved surface 41 on which the image light beams L are incident and a light-reflective curved surface 42 which reflects the image light beams L incident from the light-incident curved surface 41 between the light-incident curved surface 41 and the light-reflective curved surface 42 such that the reflected image light beams L are converted into parallel light beams, and a transparent light guide portion 50 of which one end 51 in the first direction X is connected to the light-incident portion 40. The light guide portion 50 guides the parallel light beams which are incident from the light-incident portion 40, to the light-emitting portion 58. The light guide portion 50 includes a first surface 56 (first reflection surface) extending from the one end 51 (end portion in one side X1) toward the other end 52 in the first direction X (end portion in the other side X2), a second surface 57 (second reflection surface) extending in the first direction X in parallel with the first surface 56 and in one side Z1 of the second direction Z intersecting with the first direction X, and the light-emitting portion 58 which is provided at a portion of the second surface 57 that is away from the light-incident portion 40. In the light guide system 30 with this configuration, the parallel light beams emitted from the light-incident portion 40 to the light guide portion 50 are reflected between the first surface 56 and the second surface 57, are guided to the light-emitting portion 58 from one side X1 to the other side X2 in the first direction X, and are emitted from the light-emitting portion 58.

Detailed Configuration of Image Generation System 20

The image generation system 20 is a light modulation panel configured with a liquid crystal device, an organic electroluminescence device, or the like, and is disposed so as to face the light-incident curved surface 41 in one side X1 of the first direction X and in one side Z1 of the second direction Z with respect to the light-incident portion 40. In the present embodiment, the image generation system 20 is disposed obliquely such that an end portion 21 thereof in one side X1 of the first direction X is positioned toward the other side Z2 of the second direction Z than the other end portion 22 thereof in the other side X2 of the first direction X is.

Detailed Configuration of Light-Incident Portion 40

In the light-incident portion 40, the light-incident curved surface 41 is a surface toward one side Z1 of the second direction Z, and faces the image generation system 20 via the projection lens system 70. Thus, the light-incident curved surface 41 is disposed obliquely such that an end portion 411 in the other side Z2 of the second direction Z is positioned toward one side X1 of the first direction X than an end portion 412 in one side Z1 of the second direction Z is. On the other hand, a distance between the end portion 412 of the light-incident curved surface 41 and the end portion 22 of the image generation system 20 is wider than a distance between the end portion 411 of the light-incident curved surface 41 and the end portion 21 of the image generation system 20. The light-incident curved surface 41 is made of a curved surface such as an aspherical surface or a free curved surface, and in the present embodiment, the light-incident curved surface 41 is made of a convex-shaped free curved surface. Although a reflection film or the like is not formed on the light-incident curved surface 41, the light-incident curved surface 41 totally reflects light beams which are incident at an incident angle equal to or larger than a critical angle. Thus, the light-incident curved surface 41 has transparency and reflectivity.

The light-reflective curved surface 42 is a surface toward the other side Z2 of the second direction Z, and is disposed obliquely such that an end portion 421 in one side X1 of the first direction X is positioned toward one side Z1 of the second direction Z than an end portion 422 in the other side X2 of the first direction X is. The light-reflective curved surface 42 is made of a curved surface such as an aspherical surface or a free curved surface, and in the present embodiment, the light-reflective curved surface 42 is made of a convex-shaped free curved surface. The light-reflective curved surface 42 may employ a configuration in which a reflection film or the like is not formed and light beams incident at an incident angle equal to or larger than a critical angle are totally reflected. Here, in the present embodiment, the light-reflective curved surface 42 is provided with a reflective metal layer 420 including aluminum, silver, magnesium, chromium, or the like as a main component. Thus, even in a case where the incident angle with respect to the light-reflective curved surface 42 is small, the light-reflective curved surface 42 can reliably reflect the incident light beams.

In the light-incident portion 40 with this configuration, when the image light beams L as non-parallel light beams are incident on the light-incident curved surface 41, the image light beams L incident from the light-incident curved surface 41 are refracted by the light-incident curved surface 41, and are directed toward the light-reflective curved surface 42. Next, the image light beams L are reflected by the light-reflective curved surface 42, and are directed again toward the light-incident curved surface 41. At this time, since the image light beams L are incident on the light-incident curved surface 41 at an incident angle equal to or larger than a critical angle, the image light beams L are reflected by the light-incident curved surface 41 toward the light guide portion 50. Meanwhile, the image light beams L are converted into parallel light beams. Therefore, since the image light beams L are converted into parallel light beams by using the light-reflective curved surface 42 and the light-incident curved surface 41, a design requirement for the projection lens system 70 can be relaxed. Thereby, it is possible to simplify the projection lens system 70. For example, the projection lens system 70 can be configured with two lenses (the first lens 71 and the second lens 72). In addition, since the projection lens system 70 can be simplified, it is possible to reduce a size and a weight of the display apparatus 100 (display unit 10).

Design Examples of Projection Lens System 70 and Light-Incident Portion 40

FIG. 3 is an explanatory diagram illustrating design examples of the projection lens system 70 and the light-incident portion 40 illustrated in FIG. 2. The first lens 71, the second lens 72, the light-incident curved surface 41, and the light-reflective curved surface 42 are configured as illustrated in FIG. 3. In an upper portion of FIG. 3, coefficients of a free curved surface which is represented by Equation 1 illustrated in FIG. 3 are indicated. In a lower portion of FIG. 3, a refractive index (nd) and an Abbe number (v) of a material that constitutes the first lens 71, the second lens 72, and the light-incident portion 40 are indicated. Among surface numbers (3) to (8) illustrated in FIG. 3, a surface number (3) corresponds to the light-incident curved surface 41, and a surface number (4) corresponds to the light-reflective curved surface 42. A surface number (5) corresponds to a lens surface of the second lens 72 on a light-emitting side, and a surface number (6) corresponds to a lens surface of the second lens 72 on a light-incident side. A surface number (7) corresponds to a lens surface of the first lens 71 on a light-emitting side, and a surface number (8) corresponds to a lens surface of the first lens 71 on a light-incident side.

Detailed Configuration of Light Guide Portion 50

Referring to FIG. 2 again, the first surface 56 and the second surface 57 of the light guide portion 50 are disposed in parallel, and the light guide portion 50 includes a third surface 520 between the first surface 56 and the second surface 57, the third surface 520 being disposed on the other end 52 of the light guide portion 50. A thickness between the first surface 56 and the second surface 57 in the second direction Z (a dimension of the light guide portion 50 in the second direction Z) is thinner than a dimension of the light-incident portion 40 in the second direction Z. The first surface 56 and the second surface 57 totally reflect the light beams which are incident at an incident angle equal to or larger than a critical angle, according to a difference in refractive index between the light guide portion 50 and the outside (air). Therefore, a reflection film or the like is not formed on the first surface 56 and the second surface 57.

At a portion of the light guide portion 50 that is away from the light-incident portion 40, a plurality of partial reflection surfaces 55 are disposed parallel to each other along the first direction X, the partial reflection surfaces 55 being inclined toward one side X1 of the first direction X from a normal direction with respect to the second surface 57 when viewed from the third direction Y. The light-emitting portion 58 is a portion of the second surface 57 that overlaps with the plurality of partial reflection surfaces 55 in the first direction X, and is a region with a predetermined width in the first direction X.

Each of the plurality of partial reflection surfaces 55 is made of a dielectric multilayer film. In addition, at least one of the plurality of partial reflection surfaces 55 may be a composite layer of a dielectric multilayer film and a reflective metal layer (thin film) including aluminum, silver, magnesium, chromium, or the like as a main component. In a case where the partial reflection surface 55 is configured to include a metal layer, there is an effect in that a reflectance of the partial reflection surface 55 can be increased, and in that an incident angle dependence and a polarization dependence on a transmittance and a reflectance of the partial reflection surface 55 can be optimized.

In the light guide portion 50 with this configuration, the image light beams L as parallel light beams which are incident from the light-incident portion 40 are reflected between the first surface 56 and the second surface 57, and travel from one side X1 to the other side X2 in the first direction X. A part of the image light beams L incident on the partial reflection surface 55 is reflected by the partial reflection surface 55, and is emitted from the light-emitting portion 58 toward an eye E of an observer. In addition, the rest of the image light beams L incident on the partial reflection surface 55 pass through the partial reflection surface 55, and are incident on the next partial reflection surface 55 which is adjacent to the partial reflection surface 55 in the other side X2 of the first direction X. Thus, in each of the plurality of partial reflection surfaces 55, the image light beams L reflected toward one side Z1 of the second direction Z are emitted from the light-emitting portion 58 toward the eye E of the observer. Therefore, the observer can recognize a virtual image. At that time, when light beams are incident from the outside to the light guide portion 50, the light beams are incident on the light guide portion 50, pass through the partial reflection surface 55, and reach the eye E of the observer. Therefore, the observer can see the image generated by the image generation system 20, and can see a scenery or the like of the outside in a see-through manner.

State of Parallel Light Flux in Light Guide Portion 50

Figure 4:
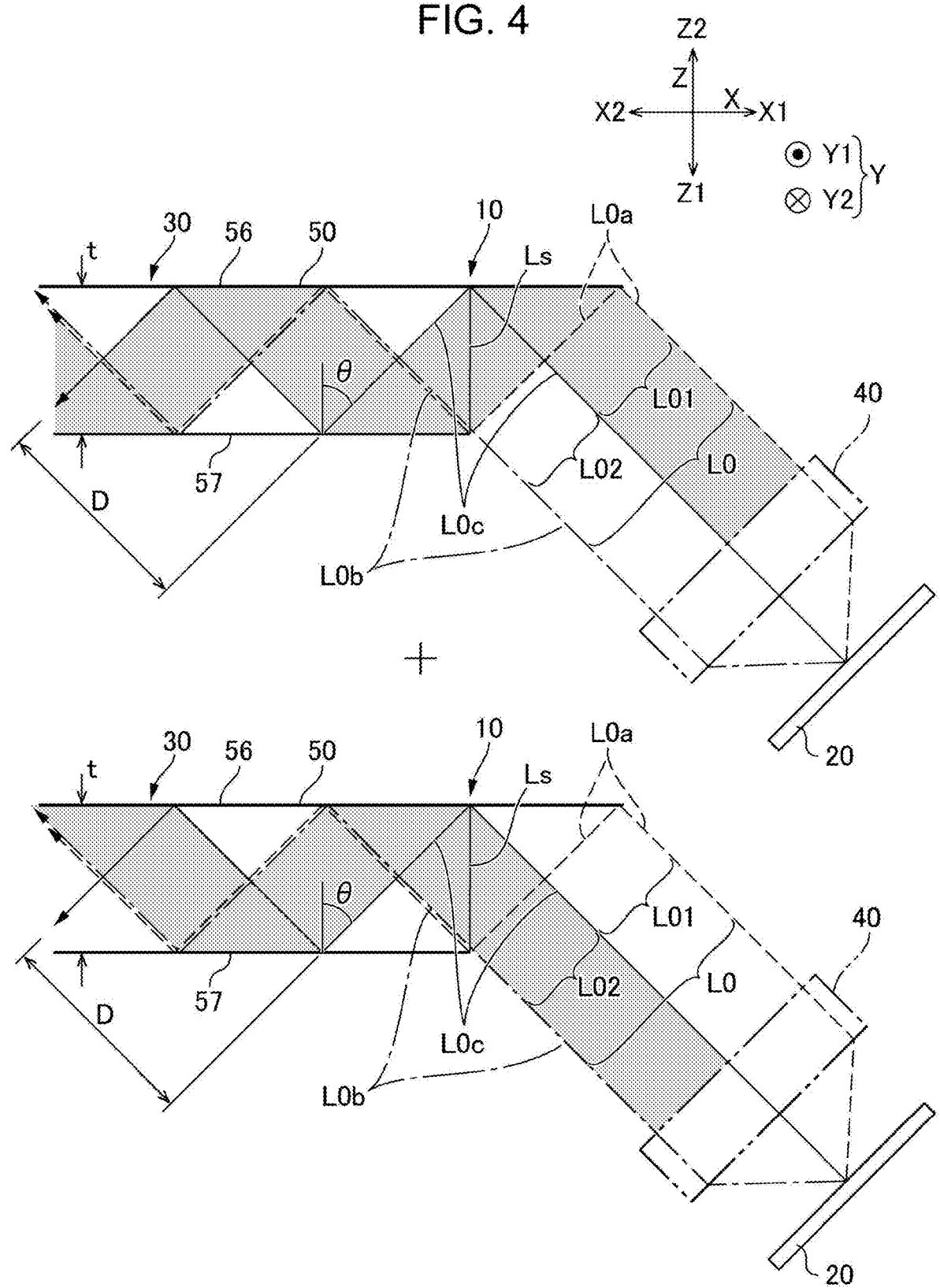
FIG. 4 is an explanatory diagram schematically illustrating a state of a parallel light flux in a light guide portion illustrated in FIG. 2.

FIG. 4 is an explanatory diagram schematically illustrating a state of a parallel light flux in the light guide portion 50 illustrated in FIG. 2, and schematically illustrates a state where a non-parallel light flux is converted into a parallel light flux L0 (image light beam L) by the light-incident portion 40 and then the parallel light flux L0 is viewed from the third direction Y, the non-parallel light flux being incident on the light-incident curved surface 41 of the light-incident portion 40 from the same portion of the image generation system 20 via the projection lens system 70. In FIG. 4, a center light beam L0c of the parallel light flux L0 is illustrated by a solid line, a first light beam L0a which is positioned at one end portion of the parallel light flux L0 is illustrated by a long broken line, and a second light beam L0b which is positioned at the other end portion of the parallel light flux L0 is illustrated by a one-dot chain line. In addition, in an upper portion of FIG. 4, a first parallel light flux portion L01 interposed between the center light beam L0c and the first light beam L0a is illustrated by a gray color, and in a lower portion of FIG. 4, a second parallel light flux portion L02 interposed between the center light beam L0c and the second light beam L0b is illustrated by a gray color.

As illustrated in FIG. 4, in the display unit 10, when the non-parallel light flux is converted into a parallel light flux L0 by the light-incident portion 40 and then the parallel light flux L0 is viewed from the third direction Y, the non-parallel light flux being incident on the light-incident curved surface 41 of the light-incident portion 40 from the same portion of the image generation system 20, the inside of one end portion (a portion in one side X1 of the first direction X) of the light guide portion 50 at which the light-incident portion 40 is positioned is filled with the parallel light flux L0. More specifically, in the parallel light flux L0, when the first parallel light flux portion L01 (gray portion) interposed between the center light beam L0c and the first light beam L0a is combined with the second parallel light flux portion L02 (gray portion) interposed between the center light beam L0c and the second light beam L0b of the parallel light flux L0, the inside of the light guide portion 50 is filled with the parallel light flux L0. Therefore, even when a thickness of the light guide portion 50 in the second direction Z is thin, the observer can recognize a virtual image with high brightness.

For example, assuming that the first surface 56 and the second surface 57 are parallel to each other, that a light flux diameter of the parallel light flux L0 is D, that a distance between the first surface 56 and the second surface 57 in the second direction Z is t, and that an incident angle of the parallel light flux L0 with respect to the first surface 56 and the second surface 57 is θ, such a configuration can be realized by setting the light flux diameter D, the distance t, and the incident angle θ so as to satisfy the following conditional equation.

$$D = 2t \times \sin\theta$$

In other words, positions at which the first light beam L0a and the second light beam L0b are incident on the second surface 57 are set so as to be positioned on an imaginary normal line Ls at a position at which the center light beam L0c is incident on the first surface 56, and thus the configuration can be realized. As illustrated in FIG. 2, although the image light beams L are emitted from each portion of the image generation system 20, in the present embodiment, the image light beams L emitted from each portion of the image generation system 20 satisfy the above condition.

Bonding Structure

Referring to FIG. 2 again, in the present embodiment, the light-incident portion 40 is formed of a first transparent member 61, a portion 54 of the light guide portion 50 at which at least the plurality of partial reflection surfaces 55 are formed is formed of a second transparent member 62 which is surface-bonded to the first transparent member 61 via a bonding surface 63 in the first direction X. The bonding surface 63 is positioned between the partial reflection surface 55 positioned closest to the one end 51 and the light-incident portion 40. Therefore, the light-incident portion 40 and the portion 54 of the light guide portion 50 in which the plurality of partial reflection surfaces 55 are formed can be manufactured by an appropriate method. In the present embodiment, the bonding surface 63 is disposed at an intermediate position between the portion 54 of the light guide portion 50 at which the partial reflection surfaces 55 are formed and the light-incident portion 40.

Here, in the bonding surface 63, a first bonding end 631 which is an end portion positioned on the other side Z2 of the second direction Z is positioned closer to the one end 51 side than a second bonding end 632 which is an end portion positioned on one side Z1 of the second direction Z is. Therefore, the bonding surface 63 is a flat surface which is inclined in the same direction as that of the partial reflection surface 55, and in the present embodiment, the bonding surface 63 is a flat surface parallel to the partial reflection surface 55.

Configuration of Third Surface 520

In the third surface 520, a first edge portion 521 positioned on the other side Z2 of the second direction Z is positioned closer to the one end 51 side than a second edge portion 522 positioned on one side Z1 of the second direction Z is. The third surface 520 is a flat surface which is inclined in the same direction as that of the partial reflection surface 55, and in the present embodiment, the third surface 520 is a flat surface parallel to the partial reflection surface 55.

Detailed Configuration of Partial Reflection Surface 55

Figure 5:
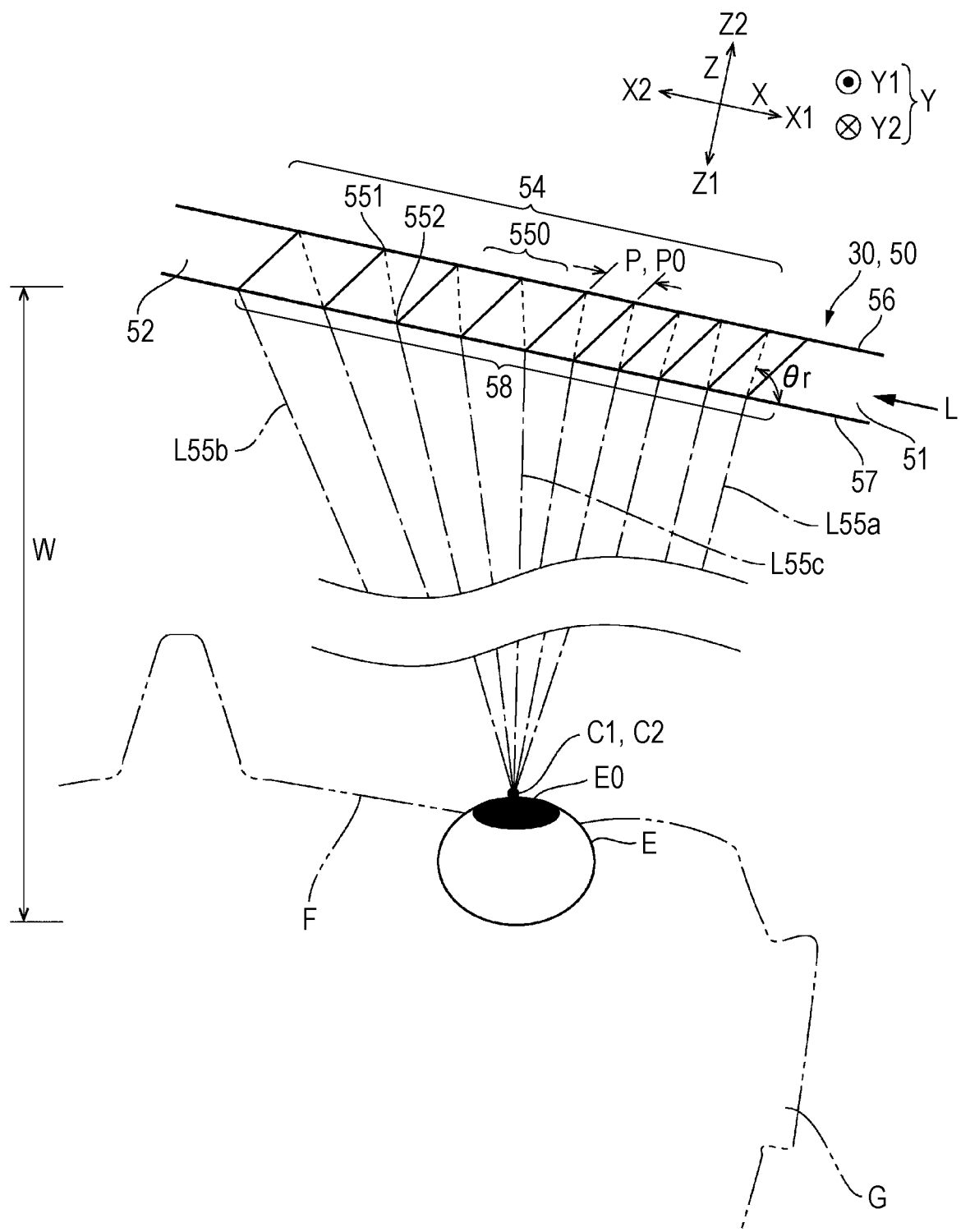
FIG. 5 is an explanatory diagram of the light guide portion of the display apparatus and a light guide device to which the embodiment is applied.
Figure 6:
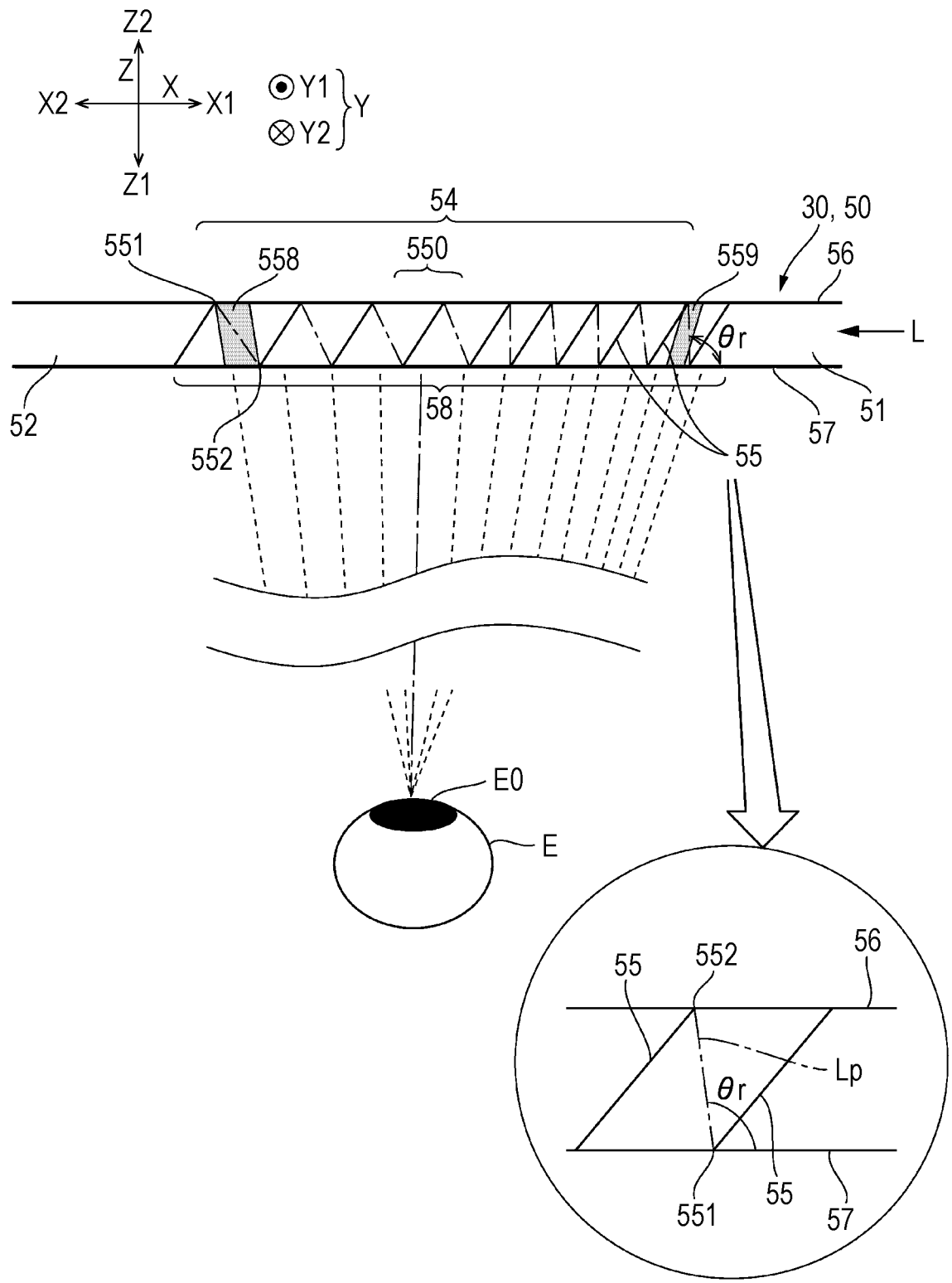
FIG. 6 is an explanatory diagram illustrating a state before the light guide portion illustrated in FIG. 5 is inclined.
Figure 7:
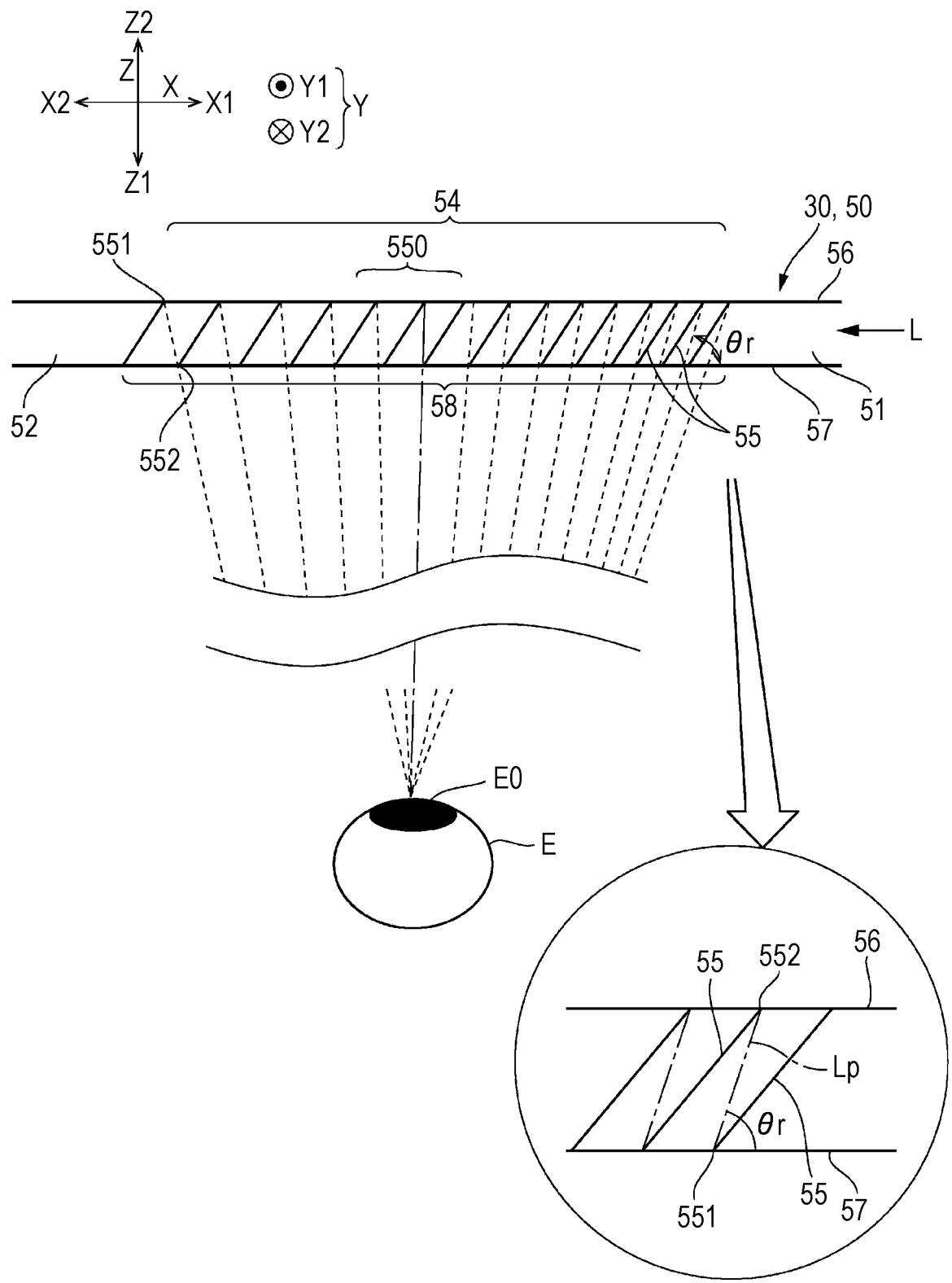
FIG. 7 is an explanatory diagram of a reference example in which intervals between partial reflection surfaces are narrower than that of the light guide portion illustrated in FIG. 6.

FIG. 5 is an explanatory diagram of the light guide portion 50 of the light guide system 30 of the display apparatus 100 to which the embodiment is applied. FIG. 6 is an explanatory diagram illustrating a state before the light guide portion 50 illustrated in FIG. 5 is inclined. FIG. 7 is an explanatory diagram of a reference example in which intervals between the partial reflection surfaces 55 are narrower than that of the light guide portion 50 illustrated in FIG. 6. In FIGS. 5, 6, and 7, an imaginary straight line connecting the first end portion 551 and the second end portion 552 and a line of sight from the eye E toward the light guide portion 50 (light-emitting portion 58) are illustrated by dotted lines.

In the present embodiment, as illustrated in FIG. 5, intervals P between the plurality of partial reflection surfaces 55 in the first direction X are widened from the one end 51 side toward the other end 52 side. In addition, in a state where the display apparatus 100 described with reference to FIG. 1 is mounted on a head of the observer and the light guide portion 50 is disposed in front of the eye E of the observer, the light guide portion 50 is inclined such that the other end 52 side is further away from a face F of the observer than the one end 51 side is. In the present embodiment, the one end 51 side is a right ear G side, and the other end 52 side is a nose H side. Therefore, the light guide portion 50 is inclined such that the nose H side (the other end 52 side) is further away from the face F of the observer than the right ear G side (the one end 51 side) is. Preferably, an incline angle of the light guide portion 50 is set to an angle equal to or smaller than 30°. When the incline angle of the light guide portion 50 is larger than 30°, visibility of the image is likely to be decreased.

In addition, in the present embodiment, when the end portion of the partial reflection surface 55 on the other side Z2 of the second direction Z is defined as the first end portion 551 and the end portion of the partial reflection surface 55 on one side Z1 of the second direction Z is defined as the second end portion 552, an angle θr formed by an imaginary straight line and a portion of the second surface 57 extending toward the one end 51 side is equal to or larger than 90°, the imaginary straight line being a line connecting the second end portion 552 of the partial reflection surface 55 positioned on the one end 51 side in the first direction X and the first end portion 551 of the partial reflection surface 55 positioned on the other end 52 side in the first direction among the two partial reflection surfaces 55 adjacent to each other in the first direction X. In the present embodiment, the angle θr is an angle larger than 90°.

Figure 16:
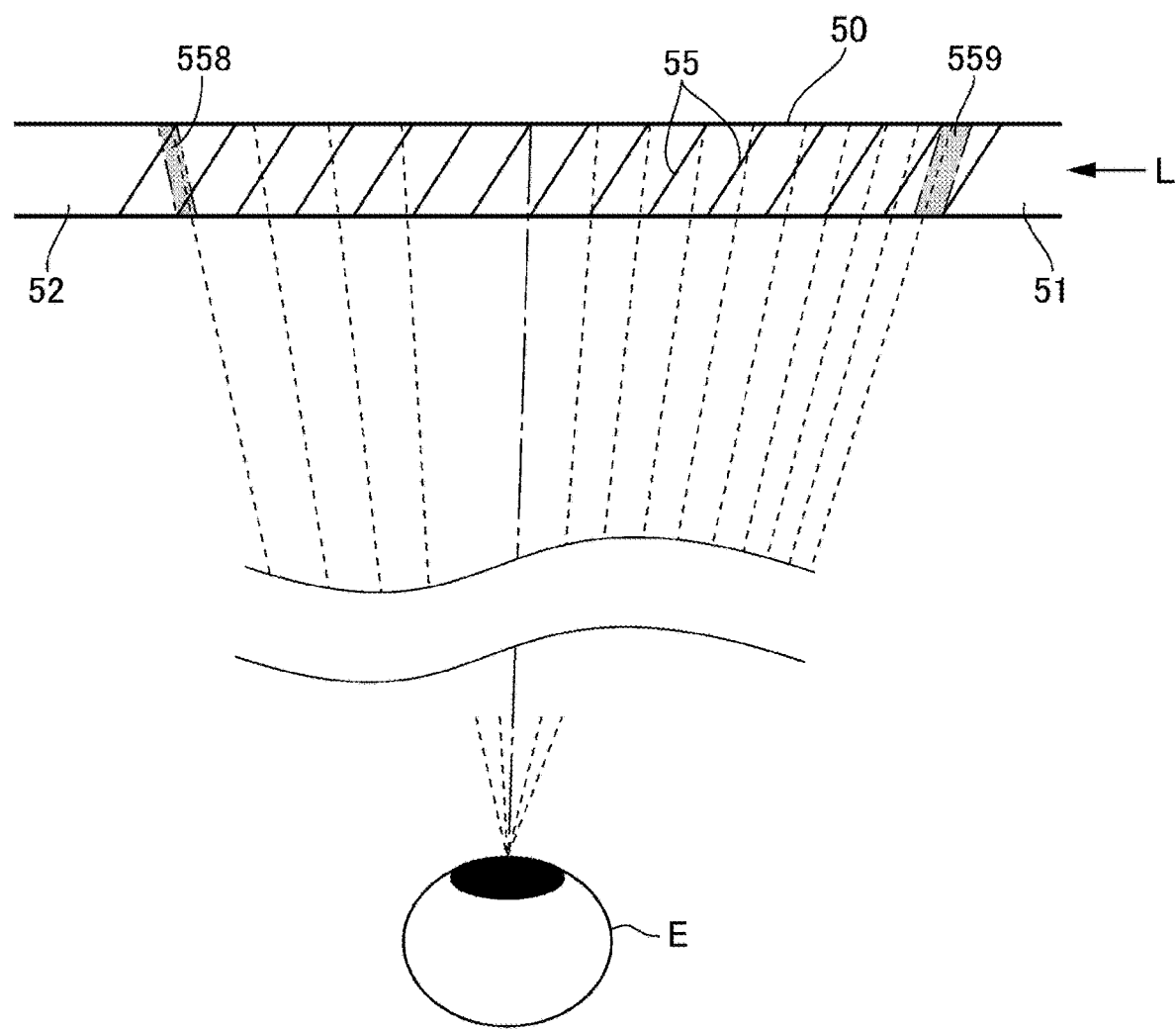
FIG. 16 is an explanatory diagram of partial reflection surfaces formed in the light guide device according to a comparative example.

Hereinafter, the reason why the interval P between the plurality of partial reflection surfaces 55 is widened from the one end 51 side toward the other end 52 side, the reason why the light guide portion 50 is inclined with respect to the face F, and the reason why the angle θr is equal to or larger than 90° will be explained with reference to FIGS. 6 and 7. First, in order to narrow the overlap portion 558 and the gap 559 described with reference to FIG. 16, as illustrated in FIG. 7, the interval P between the plurality of partial reflection surfaces 55 in the first direction X is widened from the one end 51 side toward the other end 52 side. At this time, in the reference example illustrated in FIG. 7, in the two adjacent partial reflection surfaces 55 positioned closer to the one end 51 side than the center portion 550 of the portion 54 in the first direction X is, the portion 54 being a portion on which the plurality of partial reflection surfaces 55 are disposed, the second end portion 552 of the partial reflection surface 55 positioned on the one end 51 side is positioned closer to the other end 52 side than the first end portion 551 of the partial reflection surface 55 positioned on the other end 52 side is. Therefore, when viewed from the eye E of the observer, the gap 559 between the two adjacent partial reflection surfaces 55 positioned on the one end 51 side of the light guide portion 50 that is described with reference to FIG. 16 is extremely narrow, or the gap 559 does not exist. In addition, as illustrated in FIG. 7, in the two adjacent partial reflection surfaces 55 positioned closer to the other end 52 side than the center portion 550 is, the second end portion 552 of the partial reflection surface 55 positioned on the one end 51 side is positioned closer to the one end 51 side than the first end portion 551 of the partial reflection surface 55 positioned on the other end 52 side is. Therefore, when viewed from the eye E of the observer, in the two adjacent partial reflection surfaces 55 positioned on the other end 52 side of the light guide portion 50, the overlap portion 558 between the partial reflection surfaces 55 that is described with reference to FIG. 16 is extremely narrow, or the overlap portion 558 does not exist.

On the other hand, in this case, as illustrated in an enlarged portion of the one end 51 side of FIG. 7, in the two adjacent partial reflection surfaces 55 positioned on the one end 51 side in the first direction X, the angle θr formed by an imaginary straight line Lp and the portion of the second surface 57 extending toward the one end 51 side is smaller than 90°, the imaginary straight line Lp being a line connecting the second end portion 552 of the partial reflection surface 55 positioned on the one end 51 side in the first direction X and the first end portion 551 of the partial reflection surface 55 positioned on the other end 52 side in the first direction X. For example, in a case where a horizontal viewing angle is 15° in half angle, in the light guide portion 50, a viewing angle corresponds to 10° due to refraction. As a result, the angle θr formed by the imaginary straight line Lp and the portion of the second surface 57 extending toward the one end 51 side is smaller than 90°. In a case where the partial reflection surfaces 55 are formed in such a shape, as will be described with reference to FIGS. 9 and 10, when forming inclined surfaces on which the partial reflection surfaces 55 are formed by transferring an irregular pattern formed on a mold member, the mold member may not be removed. In addition, as will be described with reference to FIG. 11, when manufacturing the portion in which the plurality of partial reflection surfaces 55 are formed by forming a stacked body in which a plurality of transparent substrates are stacked with the partial reflection surfaces interposed therebetween and cutting the stacked body, it is necessary to use extremely-thin transparent substrates.

For this reason, in the present embodiment, as in the reference example illustrated in FIG. 6, the interval P between the partial reflection surfaces 55 is wider than that in the reference example illustrated in FIG. 7. Therefore, in the two adjacent partial reflection surfaces 55 positioned closer to the other end 52 side than the center portion 550 is, the second end portion 552 of the partial reflection surface 55 positioned on the one end 51 side is positioned closer to the other end 52 side than the first end portion 551 of the partial reflection surface 55 positioned on the other end 52 side is. Accordingly, in the two adjacent partial reflection surfaces 55 in the first direction X, the angle θr formed by an imaginary straight line and the portion of the second surface 57 extending toward the one end 51 side is larger than 90°, the imaginary straight line being a line connecting the second end portion 552 of the partial reflection surface 55 positioned on the one end 51 side in the first direction X and the first end portion 551 of the partial reflection surface 55 positioned on the other end 52 side in the first direction X. In the two adjacent partial reflection surfaces 55 positioned closer to the other end 52 side than the center portion 550 is, in a case where the second end portion 552 of the partial reflection surface 55 positioned on the one end 51 side is positioned at the same position in the first direction X as that of the first end portion 551 of the partial reflection surface 55 positioned on the other end 52 side, the angle θr formed by the imaginary straight line Lp and the portion of the second surface 57 extending toward the one end 51 side is equal to or larger than 90°.

Here, in this case, the gap 559 occurs between the adjacent partial reflection surfaces 55 positioned on the one end 51 side, and the overlap portion 558 occurs between the adjacent partial reflection surfaces 55 positioned on the other end 52 side. On the other hand, in the present embodiment, as described with reference to FIG. 5, the light guide portion 50 is inclined such that the nose H side (the other end 52 side) is further away from the face F of the observer than the right ear G side (the one end 51 side) is. Therefore, the wide gap 559 or the wide overlap portion 558 described with reference to FIG. 16 do not occur between the adjacent partial reflection surfaces 55 positioned on the one end 51 side or on the other end 52 side.

Therefore, it is possible to suppress occurrence of a low-brightness streak on the image due to the overlap portion 558. In addition, it is possible to suppress occurrence of a streak-shaped omission on the image due to the gap 559. Accordingly, it is possible to suppress degradation in image quality due to the overlap portion 558 and the gap 559 between the adjacent partial reflection surfaces 55, and thus the observer can recognize a high-quality image. In addition, in the present embodiment, even in a case where the interval P between the plurality of partial reflection surfaces 55 is widened from the one end 51 side toward the other end 52 side, the incline angle of the light guide portion 50 with respect to the face F may be small. Further, the light guide portion 50 is inclined with respect to the face F, and thus an area of the partial reflection surfaces 55 toward the eye E is increased. Therefore, a streak due to a brightness difference is unlikely to occur on the image. Furthermore, in a case where the horizontal viewing angle is 15° in half angle, when the light guide portion 50 is inclined at an angle of 15°, the light beam corresponding to the horizontal viewing angle of 15° is perpendicular to the second surface 57. Thus, the angle θr formed by the imaginary straight line Lp and the portion of the second surface 57 extending toward the one end 51 side is equal to or larger than 90°. For example, the angle θr formed by the imaginary straight line Lp and the portion of the second surface 57 extending toward the one end 51 side is 90°. Accordingly, any one of first to third manufacturing methods to be described may be adopted.

Setting Example of Interval P

Figure 8:
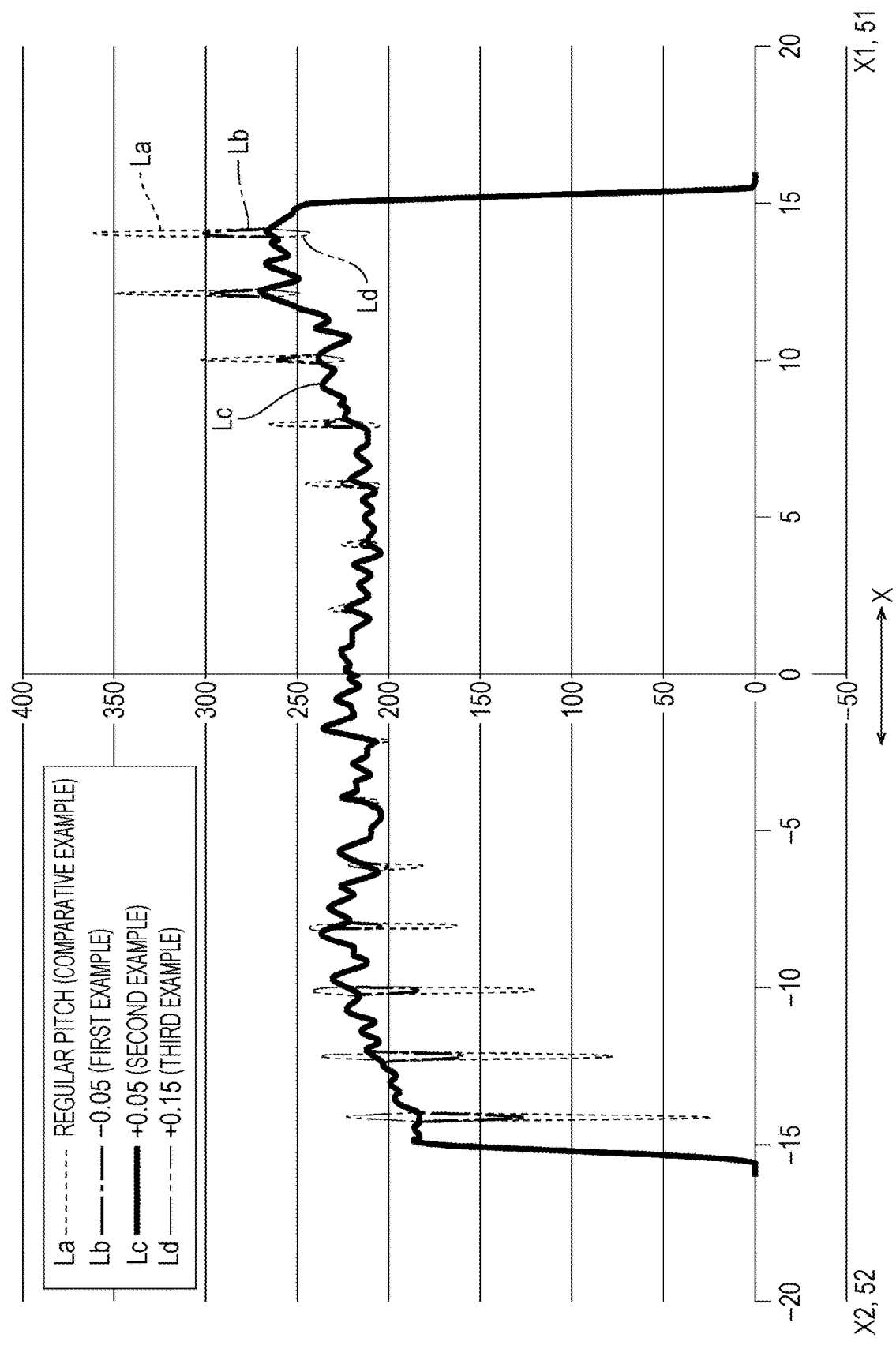
FIG. 8 is a graph illustrating a relationship (brightness distribution) between the intervals of the partial reflection surfaces described with reference to FIG. 5 and brightness in each angle direction in a first direction.

FIG. 8 is a graph illustrating a relationship (brightness distribution) between the interval P of the partial reflection surfaces 55 described with reference to FIG. 5 and brightness in each angle direction in the first direction X, and illustrates the following results. As in a comparative example to be described with reference to FIG. 11, a result at regular intervals P is illustrated by a dotted line La. A brightness distribution when the interval P is set to a value narrowed by 0.05 mm with respect to an ideal interval P0 is illustrated by an one-dot chain line Lb. A brightness distribution when the interval P is set to a value widened by 0.05 mm with respect to an ideal interval P0 is illustrated by a solid line Lc. A brightness distribution when the interval P is set to a value widened by 0.15 mm with respect to an ideal interval P0 is illustrated by a two-dot chain line Ld.

In the light guide portion 50 illustrated in FIG. 5, when drawing the imaginary straight line Lp, which connects the second end portion 552 of the partial reflection surface 55 positioned on the one end 51 side and the first end portion 551 of the partial reflection surface 55 positioned on the other end 52 side in the two adjacent partial reflection surfaces 55, the plurality of partial reflection surfaces 55 are configured such that the imaginary straight line satisfies the following condition. First, a first intersection point C1 between an imaginary straight line L55c (imaginary straight line Lp) connecting the two partial reflection surfaces 55 positioned at the center portion 550 and an imaginary straight line L55a (imaginary straight line Lp) connecting the two partial reflection surfaces 55 positioned closer to the one end 51 side than the position of the center portion 550, is positioned in a range W of 5 mm to 50 mm from the second surface 57 toward one side Z1 of the second direction Z. In addition, a second intersection point C2 between the imaginary straight line L55c (imaginary straight line Lp) connecting the two partial reflection surfaces 55 positioned at the center portion 550 and an imaginary straight line L55b (imaginary straight line Lp) connecting the two partial reflection surfaces 55 positioned closer to the other end 52 side than the position of the center portion 550, is positioned in a range W of 5 mm to 50 mm from the second surface 57 toward one side Z1 of the second direction Z.

Here, the range W is a range in which the pupil E0 may be positioned when the display apparatus 100 is mounted on the head. Therefore, as illustrated in FIG. 5, when the first intersection point C1 and the second intersection point C2 are positioned at a position overlapping with the position of the pupil E0, the imaginary straight lines L55a, L55b, L55c pass through the pupil E0. In this case, when viewed from the eye E of the observer, the gap 559 described with reference to FIG. 16 does not exist between the two adjacent partial reflection surfaces 55 positioned on the one end 51 side of the light guide portion 50, and the overlap portion 558 described with reference to FIG. 16 does not exist between the two adjacent partial reflection surfaces 55 positioned on the other end 52 side of the light guide portion 50. The interval P in this state corresponds to the ideal interval P0, and the ideal interval P0 is uniquely determined by a distance between the eye E and the light guide portion 50, the viewing angle, and the like.

Here, the pupil E0 has a width of 2 mm to 7 mm. In addition, the light beams having different viewing angles are incident on the same partial reflection surface 55. Further, the interval P may be set to a discrete numerical value according to manufacturing restrictions. Therefore, an appropriate brightness distribution may be obtained by correcting the interval P to the ideal interval P0. FIG. 8 illustrates comparatively results obtained by calculating a brightness distribution (one-dot chain line Lb) according to a first example in which the interval P is set to a value narrowed by 0.05 mm with respect to the ideal interval P0, a brightness distribution (solid line Lc) according to a second example in which the interval P is set to a value widened by 0.05 mm with respect to the ideal interval P0, and a brightness distribution (two-dot chain line Ld) according to a third example in which the interval P is set to a value widened by 0.15 mm with respect to the ideal interval P0. In addition, a brightness distribution (dotted line La) according to a comparative example in which the interval P is fixed is illustrated in FIG. 8.

As illustrated in FIG. 8, in the first example, the second example, and the third example to which the embodiment is applied, compared with the comparative example, a variation in brightness due to the overlap portion 558 and the gap 559 described with reference to FIG. 16 is unlikely to occur. In addition, when comparing the first example, the second example, and the third example with each other, the examples exhibit good brightness distributions in order of the second example, the first example, and the third example. As a result of repeating similar studies, when applying the embodiment, preferably, each interval P between the actual partial reflection surfaces 55 (each interval P between the existing partial reflection surfaces 55) is set so as to satisfy the following condition.

$$P0-P0/2 \leq P \leq P0+P0/2$$

In addition, a configuration in which the plurality of partial reflection surfaces 55 include partial reflection surfaces with intervals P widened from one end 51 side toward the other end 52 side for each interval, or a configuration in which the plurality of partial reflection surfaces 55 include partial reflection surfaces with intervals P widened from one end 51 side toward the other end 52 side for each of a plurality of intervals, may be adopted. More specifically, for the plurality of partial reflection surfaces 55, a configuration in which all intervals P are gradually widened from the one end 51 side toward the other end 52 side, may be adopted. In addition, for the plurality of partial reflection surfaces 55, a configuration in which groups of the plurality of partial reflection surfaces 55 with the same interval P are disposed in order of group with a narrower interval P from the one end 51 side toward the other end 52 side, may be adopted. Further, a configuration in which a group of the plurality of partial reflection surfaces 55 with the same interval P is included in the plurality of partial reflection surfaces 55 with intervals widened from one end 51 side toward the other end 52 side for each interval, may be adopted.

First Manufacturing Method of Light Guide Portion 50

Figure 9:
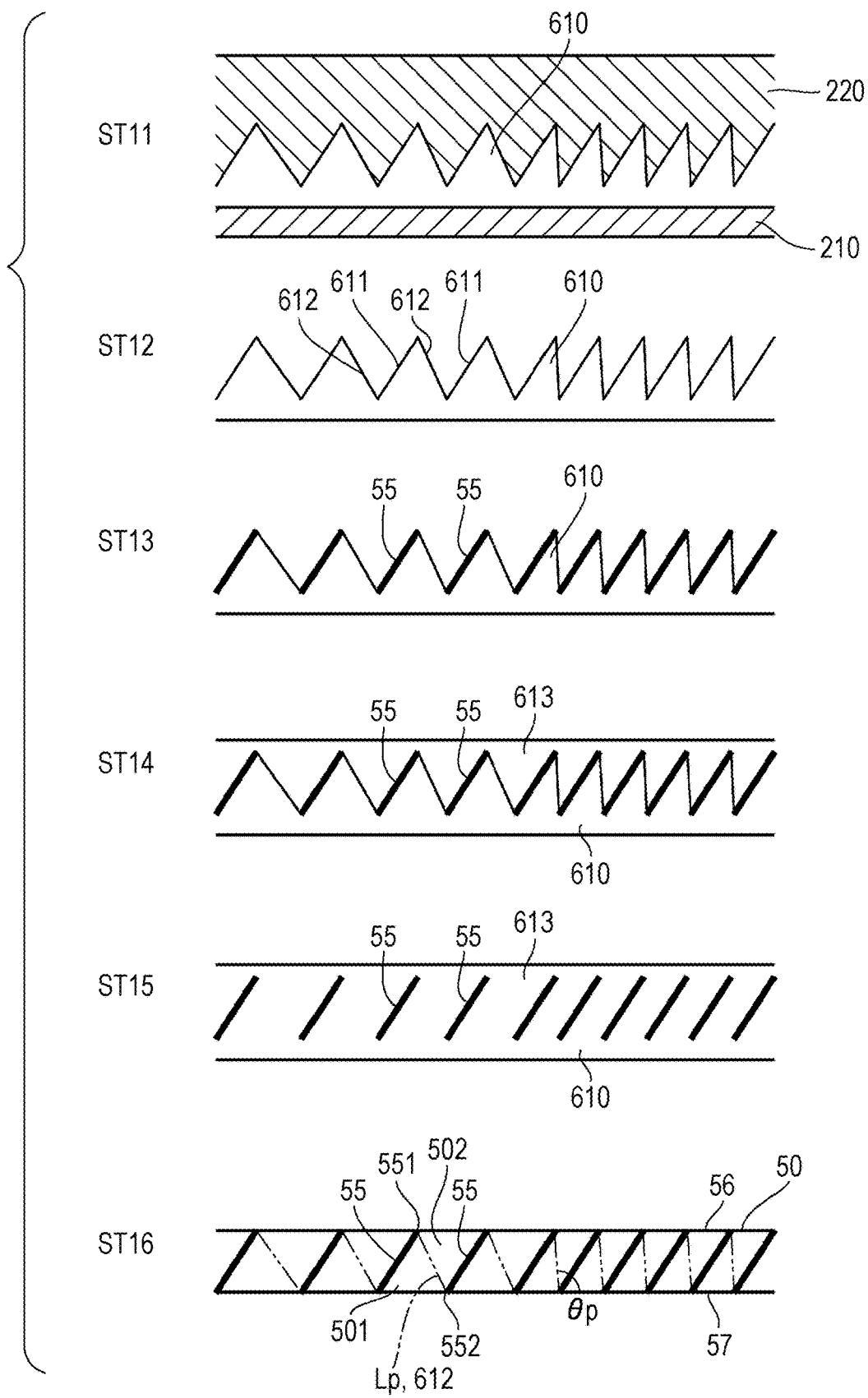
FIG. 9 is an explanatory diagram illustrating a first manufacturing method of the light guide portion illustrated in FIG. 2.

FIG. 9 is an explanatory diagram illustrating a first manufacturing method of the light guide portion 50 illustrated in FIG. 2. In order to manufacture the light guide portion 50 (second transparent member 62) illustrated in FIG. 2, first, in molding steps ST11 and ST12, a transparent member 610 is resin-molded between a first mold 210 and a second mold 220 (mold members). On the transparent member 610, first inclined surfaces 611 for forming the partial reflection surfaces 55 and second inclined surfaces 612 for connecting the adjacent first inclined surfaces 611 to each other are formed.

Next, in a partial reflection surface forming step ST13, a dielectric multilayer film is formed on the first inclined surfaces 611 by performing a film forming step and an etching step, and the partial reflection surfaces 55 are formed of the first inclined surfaces 611. Next, in a resin layer forming step ST14, spaces between the second inclined surfaces 612 and the partial reflection surfaces 55 are filled with a transparent resin 613 by applying the transparent resin 613 having the same refractive index as that of the transparent member 610 so as to cover the second inclined surfaces 612 and the partial reflection surfaces 55 (first inclined surfaces 611), and then the resin 613 is solidified. Next, in planarization steps ST15 and ST16, polishing or the like is performed on a surface of the transparent member 610 opposite to the resin 613 and a surface of the resin 613, and thereby forming the light guide portion 50 described with reference to FIG. 5. In addition, without performing polishing or the like, the transparent member 610 or the resin 613 may be left on the partial reflection surfaces 55 on one side Z1 and the other side Z2 of the second direction Z.

The light guide portion 50 includes first transparent resin portions 501 and second transparent resin portions 502, the first transparent resin portion 501 being a portion surrounded by the second surface 57, the imaginary straight line Lp (second inclined surface 612) connecting the first end portion 551 and the second end portion 552 of the adjacent partial reflection surfaces 55, and the partial reflection surface 55, and the second transparent resin portion 502 being a portion surrounded by the first surface 56, the imaginary straight line Lp (second inclined surface 612) connecting the first end portion 551 and the second end portion 552 of the adjacent partial reflection surfaces 55, and the partial reflection surface 55.

When performing the manufacturing method, in the present embodiment, the angle θr formed by the imaginary straight line Lp (second inclined surface 612) and the portion of the second surface 57 extending toward the one end 51 side is equal to or larger than 90°, the imaginary straight line Lp being a line connecting the second end portion 552 of the partial reflection surface 55 positioned on the one end 51 side in the first direction X and the first end portion 551 of the partial reflection surface 55 positioned on the other end 52 side in the first direction X. Therefore, the second mold 220 can be removed from the transparent member 610. Particularly, in a case where the angle θr is larger than 90°, the second mold 220 can be easily removed from the transparent member 610.

Second Manufacturing Method of Light Guide Portion 50

Figure 10:
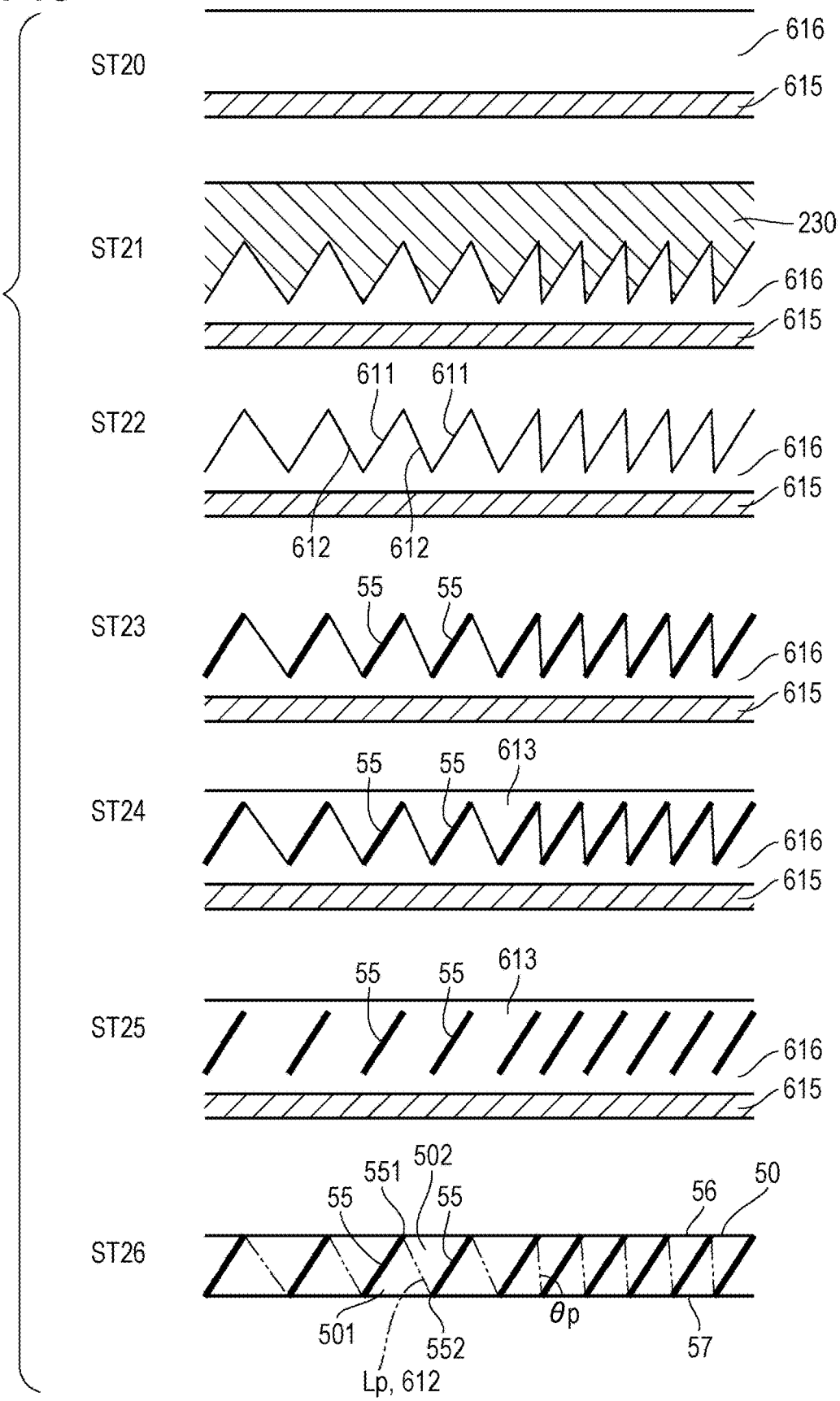
FIG. 10 is an explanatory diagram illustrating a second manufacturing method of the light guide portion illustrated in FIG. 2.

FIG. 10 is an explanatory diagram illustrating a second manufacturing method of the light guide portion 50 illustrated in FIG. 2. In order to manufacture the light guide portion 50 (second transparent member 62) illustrated in FIG. 2, first, in molding steps ST20, ST21, and ST22, a transparent resin layer 616 is applied on a substrate 615, the resin layer 616 is pressed by a transfer mold member 230, and then the resin layer 616 is solidified and the mold member 230 is removed from the resin layer 616. Thus, on the resin layer 616, first inclined surfaces 611 for forming the partial reflection surfaces 55 and second inclined surfaces 612 for connecting the adjacent first inclined surfaces 611 to each other are formed.

Next, in a partial reflection surface forming step ST23, a dielectric multilayer film is formed on the first inclined surfaces 611 by performing a film forming step and an etching step, and the partial reflection surfaces 55 are formed of the first inclined surfaces 611. Next, in a resin layer forming step ST24, spaces between the second inclined surfaces 612 and the partial reflection surfaces 55 (first inclined surfaces 611) are filled with a transparent resin 613 by applying the transparent resin 613 having the same refractive index as that of the resin layer 616 so as to cover the second inclined surfaces 612 and the partial reflection surfaces 55 (first inclined surfaces 611), and then the resin 613 is solidified. Next, in planarization steps ST25 and ST26, polishing or the like is performed on surfaces of the substrate 615, the resin layer 616, and the resin 613, and thereby forming the light guide portion 50 described with reference to FIG. 5. In addition, without performing polishing or the like of the transparent member 610 and the resin layer 616, the resin layer 616 or the resin 613 may be left on the partial reflection surfaces 55 on one side Z1 and the other side Z2 of the second direction Z. The light guide portion 50 manufactured by the method includes first transparent resin portions 501 and second transparent resin portions 502, the first transparent resin portion 501 being a portion surrounded by the second surface 57, the imaginary straight line Lp (second inclined surface 612) connecting the first end portion 551 and the second end portion 552 of the adjacent partial reflection surfaces 55, and the partial reflection surface 55, and the second transparent resin portion 502 being a portion surrounded by the first surface 56, the imaginary straight line Lp (second inclined surface 612) connecting the first end portion 551 and the second end portion 552 of the adjacent partial reflection surfaces 55, and the partial reflection surface 55.

When performing the manufacturing method, in the present embodiment, the angle θr formed by the imaginary straight line Lp (second inclined surface 612) and the portion of the second surface 57 extending toward the one end 51 side is equal to or larger than 90°, the imaginary straight line Lp being a line connecting the second end portion 552 of the partial reflection surface 55 positioned on the one end 51 side in the first direction X and the first end portion 551 of the partial reflection surface 55 positioned on the other end 52 side in the first direction X. Therefore, the mold member 230 can be removed from the resin layer 616. Particularly, in a case where the angle θr is larger than 90°, the mold member 230 can be easily removed from the resin layer 616.

Third Manufacturing Method of Light Guide Portion 50

Figure 11:
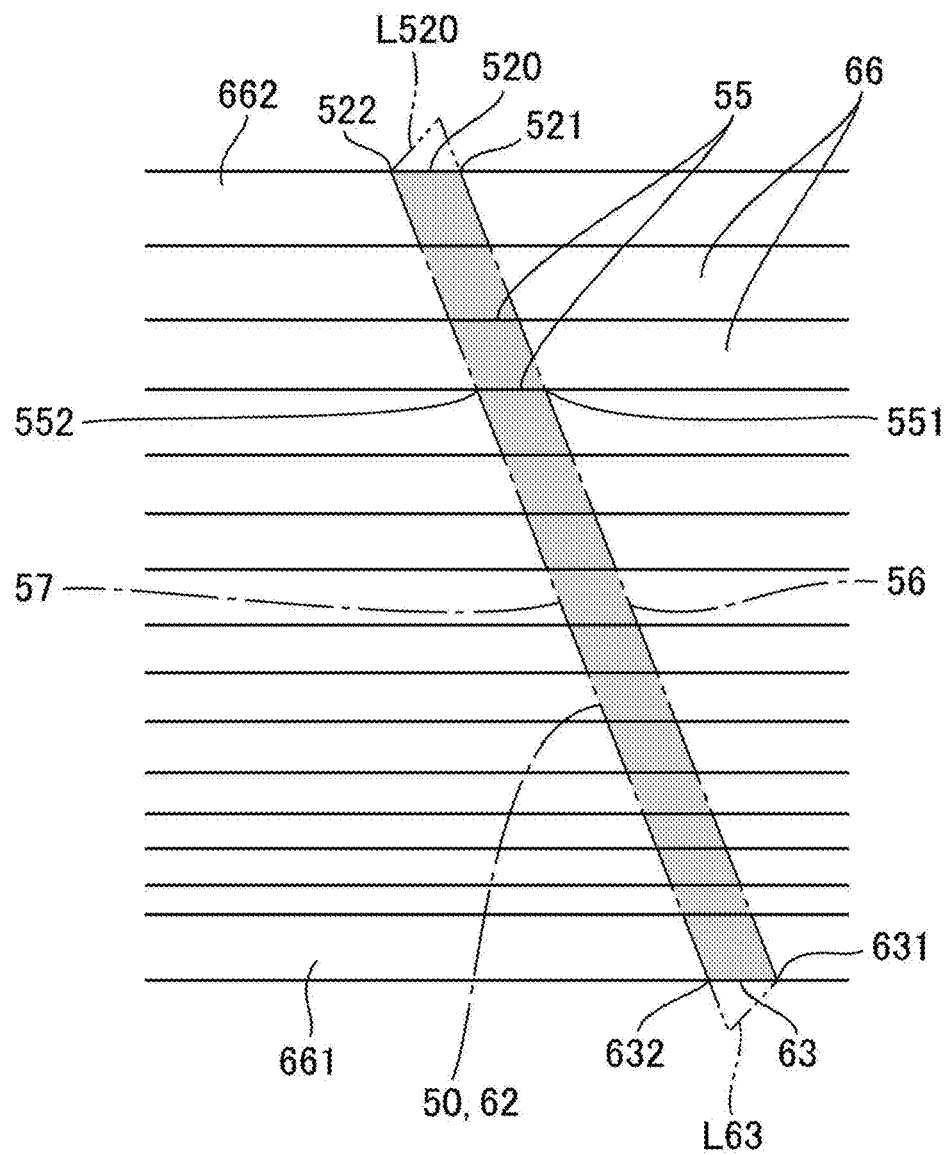
FIG. 11 is an explanatory diagram illustrating a third manufacturing method of the light guide portion illustrated in FIG. 2.

FIG. 11 is an explanatory diagram illustrating a third manufacturing method of the light guide portion 50 illustrated in FIG. 2. In order to manufacture the light guide portion 50 (second transparent member 62) illustrated in FIG. 2, first, as illustrated in FIG. 11, a plurality of transparent substrates 66, each of which includes the partial reflection surface 55 formed on one side thereof, are overlapped, and in this state, the transparent substrates 66 are bonded to each other via a bonding layer while applying a load to the transparent substrates 66, thereby forming a stacked body 67. At this time, the transparent substrate 66 without the partial reflection surface 55 is also overlapped. Next, the stacked body 67 is cut obliquely. As a result, the light guide portion 50 (second transparent member 62) is obtained. At this time, since the first surface 56 and the second surface 57 are formed by cut surfaces, polishing or the like is performed on the cut surfaces. In addition, when the thicknesses of the plurality of transparent substrates 66 is changed, as described with reference to FIG. 5, the interval P between the partial reflection surfaces 55 can be changed. The transparent substrates 66 are glass substrates, quartz substrates, resin substrates, or the like. In a case where the transparent substrates 66 are glass substrates, the transparent substrates 66 are bonded to each other by glass bonding or the like, and thus there is no need to use an adhesive. In addition, the transparent substrates 66 may be bonded to each other using an adhesive.

Here, the bonding surface 63 and the third surface 520 are formed by the transparent substrates 661 and 662 which are stacked between both ends of the light guide portion 50. Therefore, the thickness of the transparent substrate 661 is set corresponding to a distance between the bonding surface 63 and the partial reflection surface 55, and the thickness of the transparent substrate 662 is set corresponding to a distance between the third surface 520 and the partial reflection surface 55. In the present embodiment, the bonding surface 63 and the third surface 520 are inclined in the same direction as that of the partial reflection surface 55. Therefore, even in a case where the bonding surface 63 is formed by processing the transparent substrate 661 positioned on one end portion of the plurality of transparent substrates 66, unlike a case where the bonding surface 63 is inclined in a direction opposite to the partial reflection surface 55 (a case illustrated by a two-dot chain line L63), it is not necessary to make the transparent substrate 661 excessively thick. In addition, even in a case where the third surface 520 is formed by processing the transparent substrate 662 positioned on the other end portion of the plurality of transparent substrates 66, unlike a case where the third surface 520 is inclined in a direction opposite to the partial reflection surface 55 (a case illustrated by a two-dot chain line L520), it is not necessary to make the transparent substrate 662 excessively thick.

In particular, in the present embodiment, the bonding surface 63 and the third surface 520 are parallel to the partial reflection surface 55. Thus, polishing or the like may be performed on the transparent substrate 661, and there is no need to perform processing for adjusting an angle of the transparent substrate 661. In addition, there is also no need to perform processing for adjusting an angle of the transparent substrate 662.

Therefore, the light guide portion 50 (second transparent member 62) including the bonding surface 63 and the third surface 520 formed on both ends thereof can be connected to the light-incident portion 40 at a low cost, and thus it is possible to reduce a cost of the display unit 10 (display apparatus 100).

In addition, since the interval between the partial reflection surfaces 55 positioned on the one end 51 side of the light guide portion 50 is comparatively wide, for the transparent substrates 66 constituting the portion between the partial reflection surfaces 55 positioned on the one end 51 side, it is not necessary to use extremely-thin transparent substrates.

Second Embodiment

Figure 12:
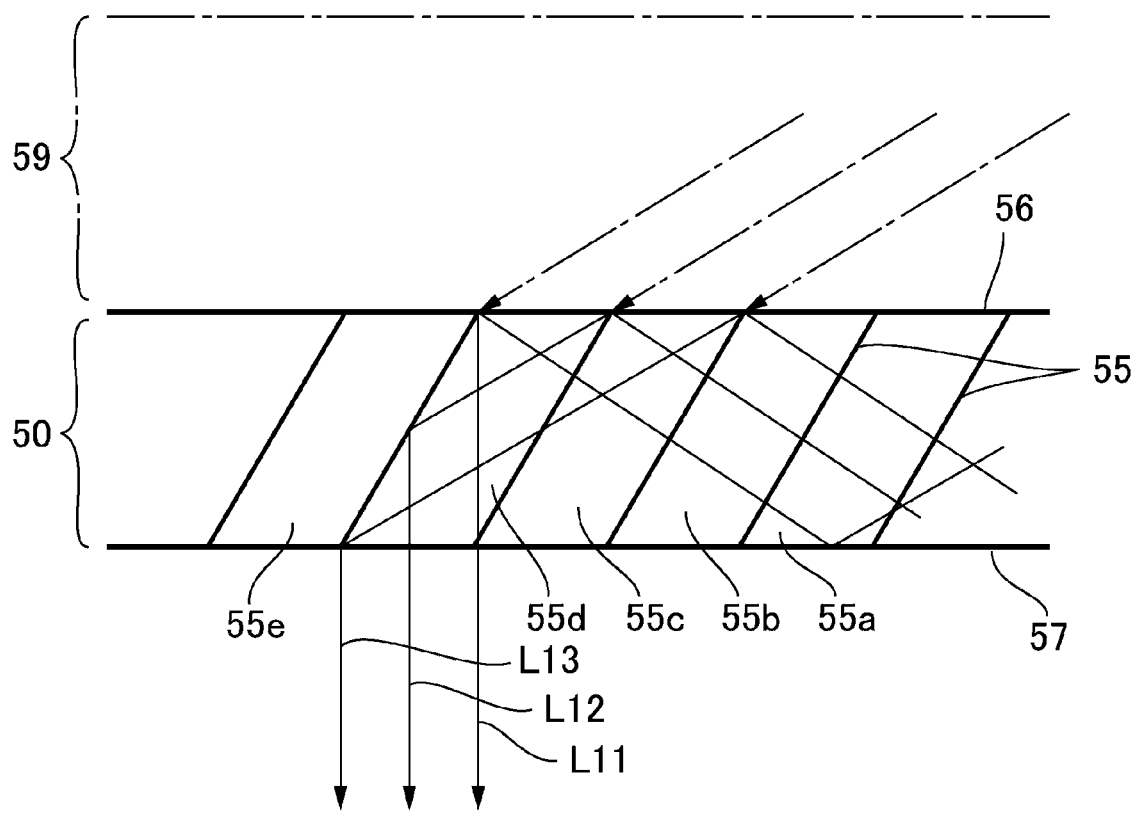
FIG. 12 is an explanatory diagram of the light guide portion of the display apparatus according to a second embodiment.

FIG. 12 is an explanatory diagram of the light guide portion 50 of the display apparatus 100 according to a second embodiment. In the present embodiment, the partial reflection surface 55 formed in the light guide portion 50 illustrated in FIG. 2 has a characteristic in that a transmittance and a reflectance change according to the incident angle. In the present embodiment, when the incident angle is large, the plurality of partial reflection surfaces 55 have a larger reflectance than the reflectance when the incident angle is small.

In the present embodiment, an angle formed by the partial reflection surface 55 and the second surface 57 is 45° to 70°. In addition, when the incident angle with respect to the partial reflection surface 55 is small, the transmittance is 98% or more, and the reflectance is 2% or less. On the other hand, when the incident angle with respect to the partial reflection surface 55 is large, the transmittance is 77%, and the reflectance is 23%. In this configuration, as described with reference to Tables 1, 2 and 3, a variation in brightness of the image light beams L emitted from each position of the light-emitting portion 58 in the first direction X can be reduced. More specifically, although light-emitting intensity of the image light beams L decreases in the light-emitting portion 58 as a distance from the light-incident portion 40 increases in the first direction X, according to the present embodiment, the decrease in the light-emitting intensity can be suppressed.

TABLE 1

| LIGHT-EMITTING POSITION | LIGHT BEAM | NUMBER OF TRANSMISSIONS | | NUMBER OF REFLECTIONS AT LARGE INCIDENT ANGLE AND REFLECTANCE OF 23% | BRIGHTNESS (%) |
|---|---|---|---|---|---|
| | | TRANSMITTANCE OF 77% AT LARGE INCIDENT ANGLE | TRANSMITTANCE OF 98% AT SMALL INCIDENT ANGLE | | |
| PORTION 55a | L11 | 0 | 0 | 1 | 23.0 |
| | L12 | 0 | 0 | 1 | 23.0 |
| | L13 | 0 | 0 | 1 | 23.0 |
| PORTION 55b | L11 | 0 | 1 | 1 | 22.5 |
| | L12 | 1 | 0 | 1 | 17.7 |
| | L13 | 1 | 0 | 1 | 17.7 |
| PORTION 55c | L11 | 0 | 2 | 1 | 22.1 |
| | L12 | 1 | 1 | 1 | 17.4 |
| | L13 | 2 | 0 | 1 | 13.6 |
| PORTION 55d | L11 | 0 | 3 | 1 | 21.6 |
| | L12 | 1 | 2 | 1 | 17.0 |
| | L13 | 2 | 1 | 1 | 13.4 |
| PORTION 55e | L11 | 1 | 3 | 1 | 16.7 |
| | L12 | 1 | 3 | 1 | 16.7 |
| | L13 | 2 | 2 | 1 | 13.1 |

TABLE 2

| LIGHT-EMITTING POSITION | LIGHT BEAM | NUMBER OF TRANSMISSIONS AT TRANSMITTANCE OF 77% | NUMBER OF REFLECTIONS AT REFLECTANCE OF 23% | BRIGHTNESS (%) |
|---|---|---|---|---|
| PORTION 55a | L11 | 0 | 1 | 23.0 |
| | L12 | 0 | 1 | 23.0 |
| | L13 | 0 | 1 | 23.0 |
| PORTION 55b | L11 | 1 | 1 | 17.7 |
| | L12 | 1 | 1 | 17.7 |
| | L13 | 1 | 1 | 17.7 |
| PORTION 55c | L11 | 2 | 1 | 13.6 |
| | L12 | 2 | 1 | 13.6 |
| | L13 | 2 | 1 | 13.6 |
| PORTION 55d | L11 | 3 | 1 | 10.5 |
| | L12 | 3 | 1 | 10.5 |
| | L13 | 3 | 1 | 10.5 |
| PORTION 55e | L11 | 4 | 1 | 8.1 |
| | L12 | 4 | 1 | 8.1 |
| | L13 | 4 | 1 | 8.1 |

TABLE 3

| LIGHT-EMITTING POSITION | LIGHT BEAM | NUMBER OF TRANSMISSIONS AT TRANSMITTANCE OF 77% | NUMBER OF REFLECTIONS AT REFLECTANCE OF 23% | BRIGHTNESS (%) |
|---|---|---|---|---|
| PORTION 55a | L11 | 0 | 1 | 23.0 |
| | L12 | 0 | 1 | 23.0 |
| | L13 | 0 | 1 | 23.0 |
| PORTION 55b | L11 | 0 | 1 | 23.0 |
| | L12 | 1 | 1 | 17.7 |
| | L13 | 1 | 1 | 17.7 |
| PORTION 55c | L11 | 0 | 1 | 23.0 |
| | L12 | 0 | 1 | 17.7 |
| | L13 | 2 | 1 | 13.6 |
| PORTION 55d | L11 | 0 | 1 | 23.0 |
| | L12 | 1 | 1 | 17.7 |
| | L13 | 2 | 1 | 13.6 |
| PORTION 55e | L11 | 0 | 1 | 23.0 |
| | L12 | 1 | 1 | 17.7 |
| | L13 | 2 | 1 | 13.6 |

For example, in a case where the brightness (light-emitting intensity) of the light beams emitted from each portion between the partial reflection surfaces 55 illustrated in FIG. 2 is calculated, as shown in a result of Table 1, a variation in brightness of the image light beams L emitted from each position of the light-emitting portion 58 in the first direction X can be reduced. Table 1 shows the number of transmissions and the number of reflections until the image light beams L are emitted from portions 55a, 55b, 55c, 55d, and 55e between the partial reflection surfaces 55 illustrated in FIG. 12. The number of reflections when the image light beams L are finally reflected at a large incident angle is shown. On the other hand, in a case where the incident angle is large and a case where the incident angle is small, there is a difference in the number of transmissions. In the present embodiment, the transmittance at the partial reflection surface 55 differs depending on the incident angle. Therefore, the number of transmissions is shown by being divided into a case where the incident angle is large and a case where the incident angle is small. In addition, among the light beams emitted from the portions 55a, 55b, 55c, 55d, and 55e illustrated in FIG. 12, Table 1 shows brightness of the light beam L11 emitted from the portion positioned closest to one side X1 of the first direction X, the light beam L12 emitted from the portion positioned at the center in the first direction X, and the light beam L13 emitted from the portion positioned closest to the other side X2 of the first direction X.

As can be seen from Table 1, the brightness in each of the portions 55a, 55b, 55c, 55d, and 55e is from 13.1% to 23%, and a variation in brightness is small. In addition, a variation in brightness of the light beams L11, L12, and L13 emitted from each of the portions 55a, 55b, 55c, 55d, and 55e is small. On the other hand, in a case where the transmittance at the partial reflection surface 55 is 77% or more and the reflectance at the partial reflection surface 55 is 23% regardless of the incident angle with respect to the partial reflection surface 55, the brightness of each of the light beams L11, L12, and L13 emitted from each of the portions 55a, 55b, 55c, 55d, and 55e is shown in Table 2. As can be seen from Table 2, the brightness of each of the light beams L11, L12, and L13 emitted from each of the portions 55a, 55b, 55c, 55d, and 55e is from 8.1% to 23%, and a variation in brightness is large.

In addition, as illustrated in FIG. 12, in a case where a light-transmitting layer 59 in which the partial reflection surfaces 55 are not formed is provided on the light guide portion 50, in which the partial reflection surfaces 55 are formed, on the other side Z2 of the second direction Z, the number of transmissions through the partial reflection surfaces 55 can be reduced. Therefore, in a case where the transmittance at the partial reflection surface 55 is 77% or more and the reflectance at the partial reflection surface 55 is 23% regardless of the incident angle with respect to the partial reflection surface 55, the brightness of each of the light beams L11, L12, and L13 emitted from each of the portions 55a, 55b, 55c, 55d, and 55e is shown in Table 3. As can be seen from Table 3, the brightness of each of the light beams L11, L12, and L13 emitted from each of the portions 55a, 55b, 55c, 55d, and 55e is from 13.1% to 23%, and a variation in brightness is small. Here, in this case, the thickness of the light guide system 30 in the second direction Z is increased by the provision of the light-transmitting layer 59.

Therefore, as in the present embodiment, instead of providing the light-transmitting layer 59 (refer to FIG. 12) in which the partial reflection surfaces 55 are not formed, the light guide portion 50 is formed only by the portion in which the partial reflection surfaces 55 are formed, and thus, even in a case where the thickness of the light guide portion 50 is decreased, it is possible to reduce a difference in brightness of the image light beams L emitted from a position of the light-emitting portion 58 away from the light-incident portion 40 in the first direction X. In addition, a variation in brightness of the light beams L11, L12, and L13 emitted from each of the portions 55a, 55b, 55c, 55d, and 55e can be reduced. Further, since unnecessary reflection at the partial reflection surfaces 55 is reduced, it is possible to suppress a deterioration in display quality due to occurrence of ghost.

Third Embodiment

In the second embodiment, when the incident angle with respect to the partial reflection surface 55 is large, the reflectance of the partial reflection surface 55 is larger than that when the incident angle with respect to the partial reflection surface 55 is small. On the other hand, for example, in a case where an angle formed by the partial reflection surface 55 and the second surface 57 is 25° to 40°, when the incident angle with respect to the partial reflection surface 55 is small, a configuration in which the reflectance of the partial reflection surface 55 is larger than that when the incident angle with respect to the partial reflection surface 55 is large, may be adopted.

Fourth Embodiment

Figure 13:
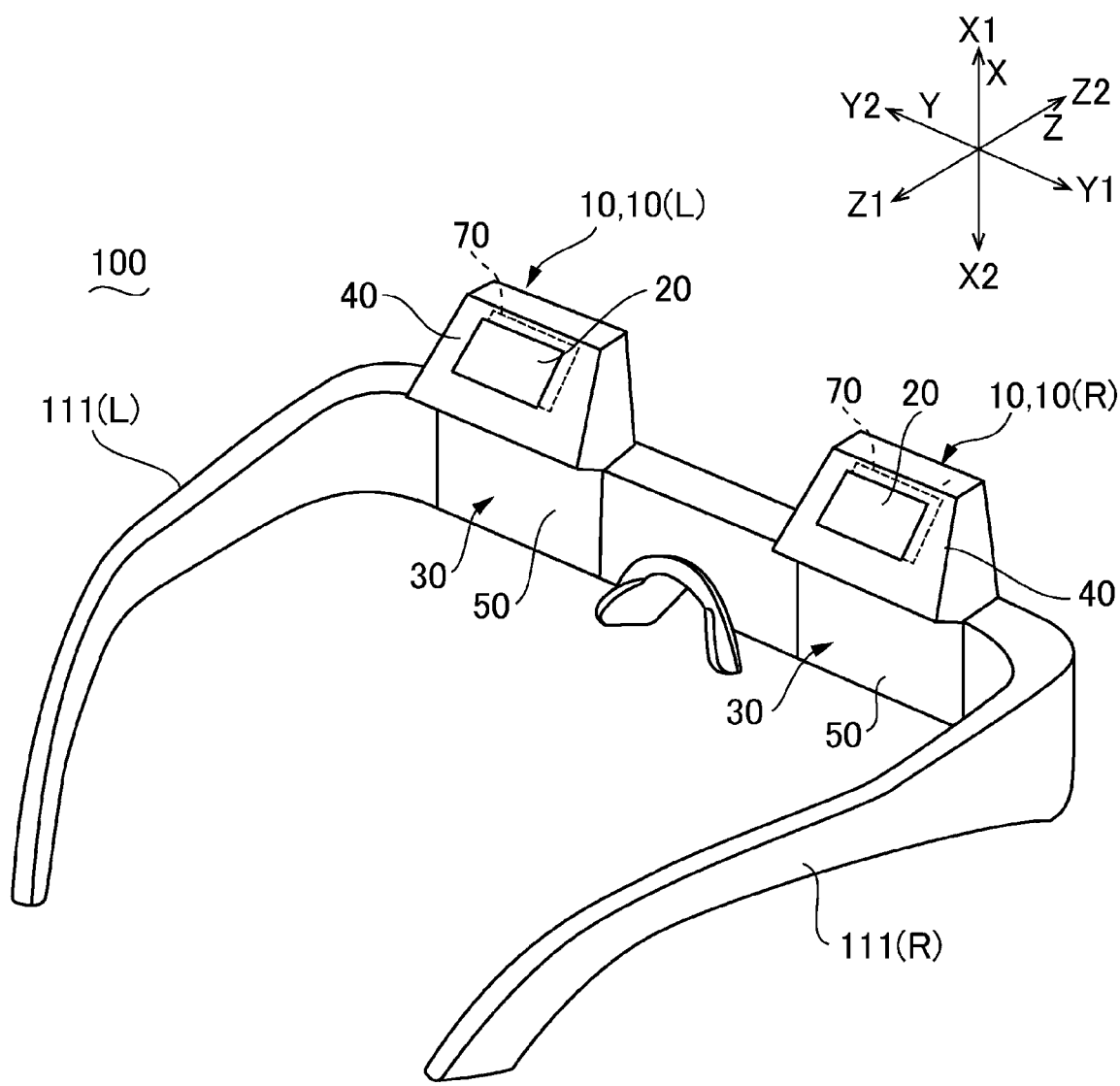
FIG. 13 is an explanatory view schematically illustrating an example of an appearance of the display apparatus according to a fourth embodiment.
Figure 14:
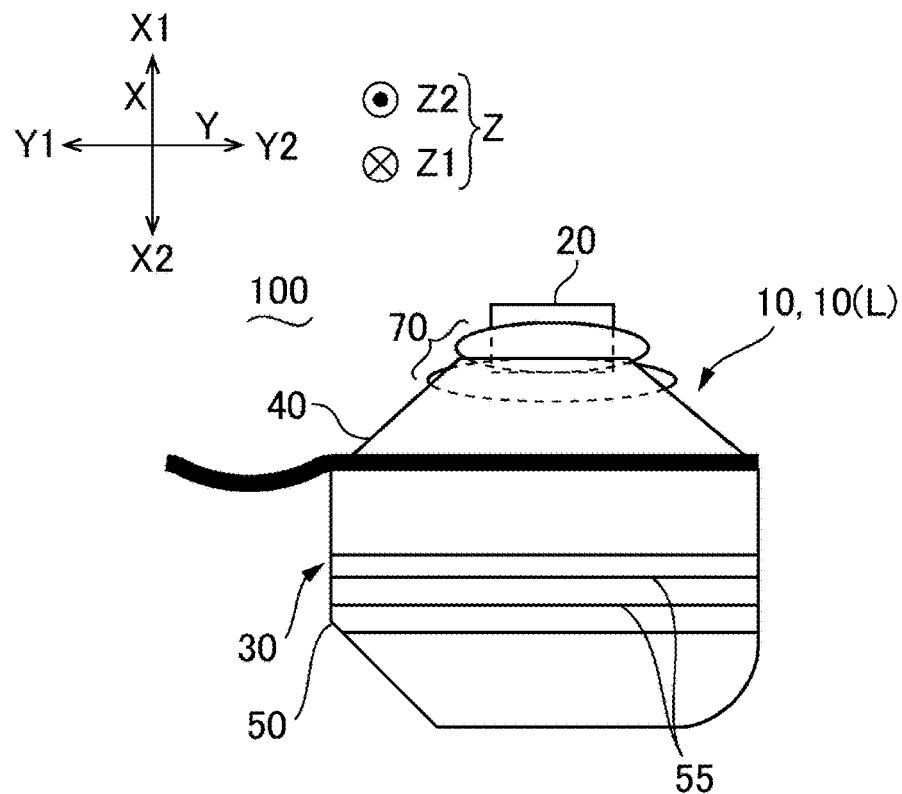
FIG. 14 is a front view of the display apparatus illustrated in FIG. 13 when viewed from a front direction of an observer.
Figure 15:
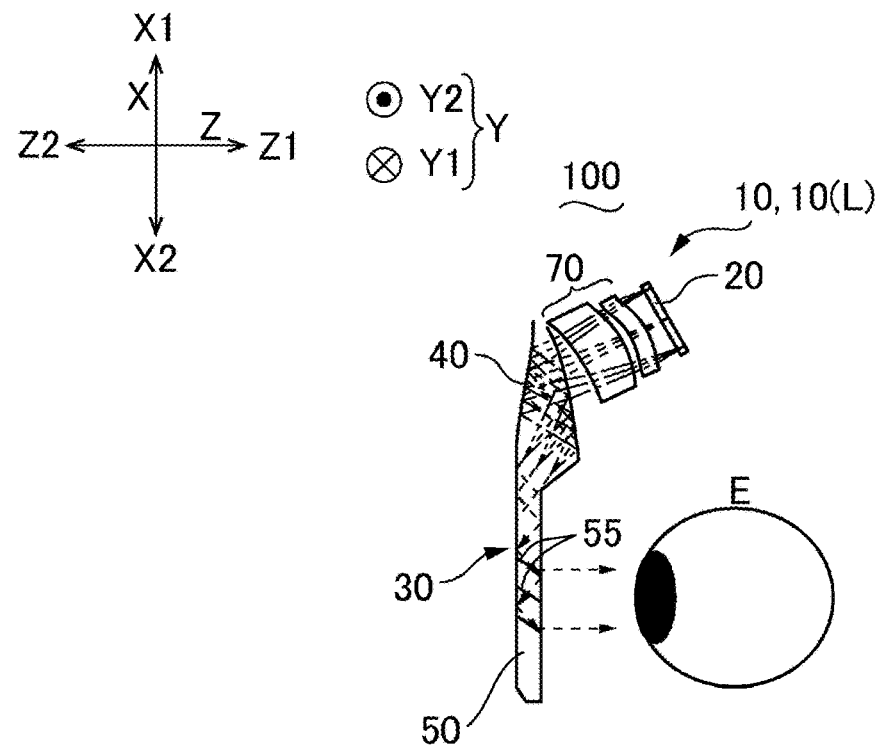
FIG. 15 is a side view of the display apparatus illustrated in FIG. 13 when viewed from a left side.

FIG. 13 is an explanatory view schematically illustrating an example of an appearance of the display apparatus 100 according to a fourth embodiment. FIG. 14 is a front view of the display apparatus 100 illustrated in FIG. 13 when viewed from a front direction of the observer. FIG. 15 is a side view of the display apparatus 100 illustrated in FIG. 13 when viewed from a left side. In the display apparatus 100 according to the first embodiment, the image generation system 20 and the light-incident portion 40 are disposed on an ear side, and the image light beams L are guided from the ear side toward a nose side. On the other hand, in the present embodiment, as illustrated in FIGS. 13, 14, and 15, the image generation system 20 and the light-incident portion 40 are disposed in front of the eye and above the eye, and the light guide portion 50 extends from an upper side toward a lower side. Thus, the image light beams L are guided from the upper side toward the lower side, and are emitted toward the eye. Therefore, in the present embodiment, an upper-lower direction corresponds to the first direction X, a front-rear direction corresponds to the second direction Z, and a right-left direction corresponds to the third direction Y. In addition, one side X1 of the first direction X corresponds to the upper side, and the other side X2 of the first direction X corresponds to the lower side. In this case, the interval P described with reference to FIG. 5 is made wider from one side X1 (upper side) toward the other side X2 (lower side) of the first direction X. In addition, the one end 51 side described with reference to FIG. 5 is positioned on the upper side, and the other end 52 side is positioned on the lower side. Therefore, in a state where the display apparatus 100 is mounted on a head of the observer and the light guide portion 50 is disposed in front of the eye of the observer, the light guide portion 50 is inclined such that the other end 52 side is further away from a face of the observer than the one end 51 side is.

Other Embodiments

In the embodiments described above, an anti-reflection film may be provided on the first surface 56 or the second surface 57. Even in a case where light beams from the outside (see-through light beams) are transmitted or a case where the image light beams L are emitted from the light guide portion 50 to the outside, when reflection occurs at an interface between the light guide portion 50 and the light-incident portion 40, a loss in the light beams occurs due to the reflection. Therefore, by providing the anti-reflection film, it is possible to increase the brightness for both of the see-through light beams and the image light beams L. In addition, an amount of unnecessary return light beams can be decreased, and thus occurrence of ghost can be suppressed.

The entire disclosure of Japanese Patent Application No. 2017-062398, filed Mar. 28, 2017 is expressly incorporated by reference herein.

What is claimed is:

1. A display apparatus comprising:
an image generation system; and
a light guide device that includes a transparent light guide portion which guides image light beams emitted from the image generation system to a light-emitting portion, the light guide portion having one end side on which the image light beams are incident and another end side opposing the one end side in a first direction;
wherein the light guide portion includes a first surface extending from the one end side toward the another end side in the first direction, a second surface extending in the first direction so as to be parallel to the first surface on one side of a second direction intersecting with the first direction, and a plurality of partial reflection surfaces which are disposed along the first direction between the first surface and the second surface and are inclined at the same angle from a normal direction with respect to the second surface toward the one end side,
wherein intervals between the plurality of partial reflection surfaces in the first direction are widened from the one end side toward the another end side, the plurality of partial reflection surfaces include partial reflection surfaces with which intervals are widened from the one end side toward the another end side in the first direction for each interval, and an amount of widening of the intervals increases from the one end side toward the another end side in the first direction,
wherein the light guide portion is configured to be mounted on the head of an observer with the first direction extending between the left and right of the head, where the light guide portion is disposed in front of an eye of the observer with the another end side closer to the nose of the observer in the first direction than the one end side is, with the light guide portion being inclined such that the another end side is further away from the face of the observer in the second direction than the one end side is,
wherein, in two partial reflection surfaces adjacent to each other in the first direction among the plurality of partial reflection surfaces, an angle formed by an imaginary straight line and a portion of the second surface extending toward the one end side is equal to or larger than 90°, the imaginary straight line being a line connecting an end portion of one of the two partial reflection surfaces, which is positioned on the one end side in the first direction, on one side of the second direction and an end portion of the other of the two partial reflection surfaces, which is positioned on the another end side in the first direction, on the another side of the second direction, and
wherein the angle in each pair of two adjacent partial reflection surfaces increases from the one end side toward the another end side in the first direction.

2. The display apparatus according to claim 1,
wherein the angle formed by the imaginary straight line and the portion of the second surface extending toward the one end side is larger than 90°.

3. The display apparatus according to claim 1,
wherein the light guide portion includes a first transparent resin portion constituting a portion surrounded by the second surface, the imaginary straight line, and the partial reflection surfaces, and a second transparent resin portion constituting a portion surrounded by the first surface, the imaginary straight line, and the partial reflection surfaces.

4. The display apparatus according to claim 1,
wherein the plurality of partial reflection surfaces include partial reflection surfaces with which intervals are widened from the one end side toward the another end side in the first direction for each of a plurality of intervals.

5. The display apparatus according to claim 1,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

6. The display apparatus according to claim 5,
wherein the light-incident portion is formed of a first transparent member, and
wherein at least a portion of the light guide portion in which the plurality of partial reflection surfaces are formed is formed of a second transparent member which is surface-bonded to the first transparent member via a bonding surface in the first direction.

7. The display apparatus according to claim 1,
wherein at least one partial reflection surface among the plurality of partial reflection surfaces includes a multilayer film including a reflective metal layer.

8. The display apparatus according to claim 1,
wherein the plurality of partial reflection surfaces have a characteristic in which a reflectance changes according to an incident angle.

9. A light guide device comprising:
a transparent light guide portion that includes one end side and another end side opposing the one end side in a first direction and guides light beams incident from the one end side to a light-emitting portion,
wherein the light guide portion includes a first surface extending from the one end side on which the light beams are incident toward the another end side in the first direction, a second surface extending in the first direction so as to be parallel to the first surface on one side of a second direction intersecting with the first direction, and a plurality of partial reflection surfaces which are disposed along the first direction between the first surface and the second surface and are inclined at the same angle from a normal direction with respect to the second surface toward the one end side, wherein the light guide portion is configured to be mounted on the head of an observer with the first direction extending between the left and right of the head, where the light guide portion is disposed in front of an eye of the observer with the another end side closer to the nose of the observer in the first direction than the one end side is, intervals between the plurality of partial reflection surfaces in the first direction are widened from the one end side toward the another end side, the plurality of partial reflection surfaces include partial reflection surfaces with which intervals are widened from the one end side toward the another end side in the first direction for each interval, and an amount of widening of the intervals increases from the one end side toward the another end side in the first direction, wherein, in two partial reflection surfaces adjacent to each other in the first direction among the plurality of partial reflection surfaces, an angle formed by an imaginary straight line and the second surface extending toward the one end side is equal to or larger than 90°, the imaginary straight line being a line connecting an end portion of one of the two partial reflection surfaces, which is positioned on the one end side in the first direction, on one side of the second direction and an end portion of the other of the two partial reflection surfaces, which is positioned on the another end side in the first direction, on the another side of the second direction, and wherein the angle in each pair of two adjacent partial reflection surfaces increases from the one end side toward the another end side in the first direction.

10. The light guide device according to claim 9, wherein the angle formed by the imaginary straight line and the second surface is larger than 90°.

11. The light guide device according to claim 9, wherein the light guide portion includes a first transparent resin portion constituting a portion surrounded by the second surface, the imaginary straight line, and the partial reflection surfaces, and a second transparent resin portion constituting a portion surrounded by the first surface, the imaginary straight line, and the partial reflection surfaces.

* * * * *